United States Patent
Suzuki et al.

(10) Patent No.: US 8,864,266 B2
(45) Date of Patent: Oct. 21, 2014

(54) PRINTING DEVICE AND PRINTING METHOD

(75) Inventors: Fumiko Suzuki, Kawasaki (JP); Norihiro Kawatoko, Yokohama (JP); Hitoshi Nishikori, Inagi (JP); Osamu Iwasaki, Tokyo (JP); Atsuhiko Masuyama, Yokohama (JP); Satoshi Masuda, Yokohama (JP); Tomoki Yamamuro, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 13/457,730

(22) Filed: Apr. 27, 2012

(65) Prior Publication Data

US 2012/0287193 A1  Nov. 15, 2012

(30) Foreign Application Priority Data

May 9, 2011 (JP) .................. 2011-104220

(51) Int. Cl.
*B41J 2/205* (2006.01)
*B41J 29/38* (2006.01)
*B41J 2/015* (2006.01)
*B41J 2/15* (2006.01)
*B41J 2/14* (2006.01)
*B41J 2/07* (2006.01)
*B41J 2/21* (2006.01)
*G06K 15/10* (2006.01)
*B41J 2/155* (2006.01)

(52) U.S. Cl.
CPC ......... *B41J 2/2125* (2013.01); *G06K 2215/111* (2013.01); *G06K 15/102* (2013.01); *B41J 2/155* (2013.01)

USPC ........ 347/15; 347/9; 347/20; 347/40; 347/47; 347/74

(58) Field of Classification Search
USPC .......................... 347/9, 13, 15, 20, 40, 47, 74
See application file for complete search history.

(56) References Cited

U.S. PATENT DOCUMENTS

| | | | |
|---|---|---|---|
| 6,877,833 B2 | 4/2005 | Teshigawara et al. | |
| 6,899,413 B2 | 5/2005 | Otsuka et al. | |
| 7,192,112 B2 | 3/2007 | Nakanishi et al. | |
| 7,249,815 B2* | 7/2007 | Keller et al. ....................... | 347/9 |
| 7,618,116 B2 | 11/2009 | Hamasaki et al. | |
| 7,690,744 B2 | 4/2010 | Nakanishi et al. | |
| 7,959,246 B2 | 6/2011 | Hamasaki et al. | |
| 2005/0057591 A1* | 3/2005 | Konno ............................. | 347/13 |

* cited by examiner

*Primary Examiner* — Sarah Al Hashimi
(74) *Attorney, Agent, or Firm* — Fitzpatrick, Cella, Harper & Scinto

(57) ABSTRACT

A printing device using a print head ejecting ink from a plurality of nozzles to print ink dots of a plurality of dot diameters, includes a print-characteristic acquisition unit obtaining print characteristic information on dot diameters of ink dots to be printed per each predetermined portion of the plurality of nozzles, a distribution ratio determination unit determining a distribution ratio for distributing image data to the predetermined portions of the plurality of nozzles based on the information, a dot print position determination unit quantizing the image data to determine a dot print position based on the image data and sizes and an array of thresholds; and a plurality of masks based on dot distribution order determined according to the distribution ratio, distributing printing of each of the ink dots of the plurality of dot diameters to the dot print position determined by the dot print position determination unit.

10 Claims, 19 Drawing Sheets

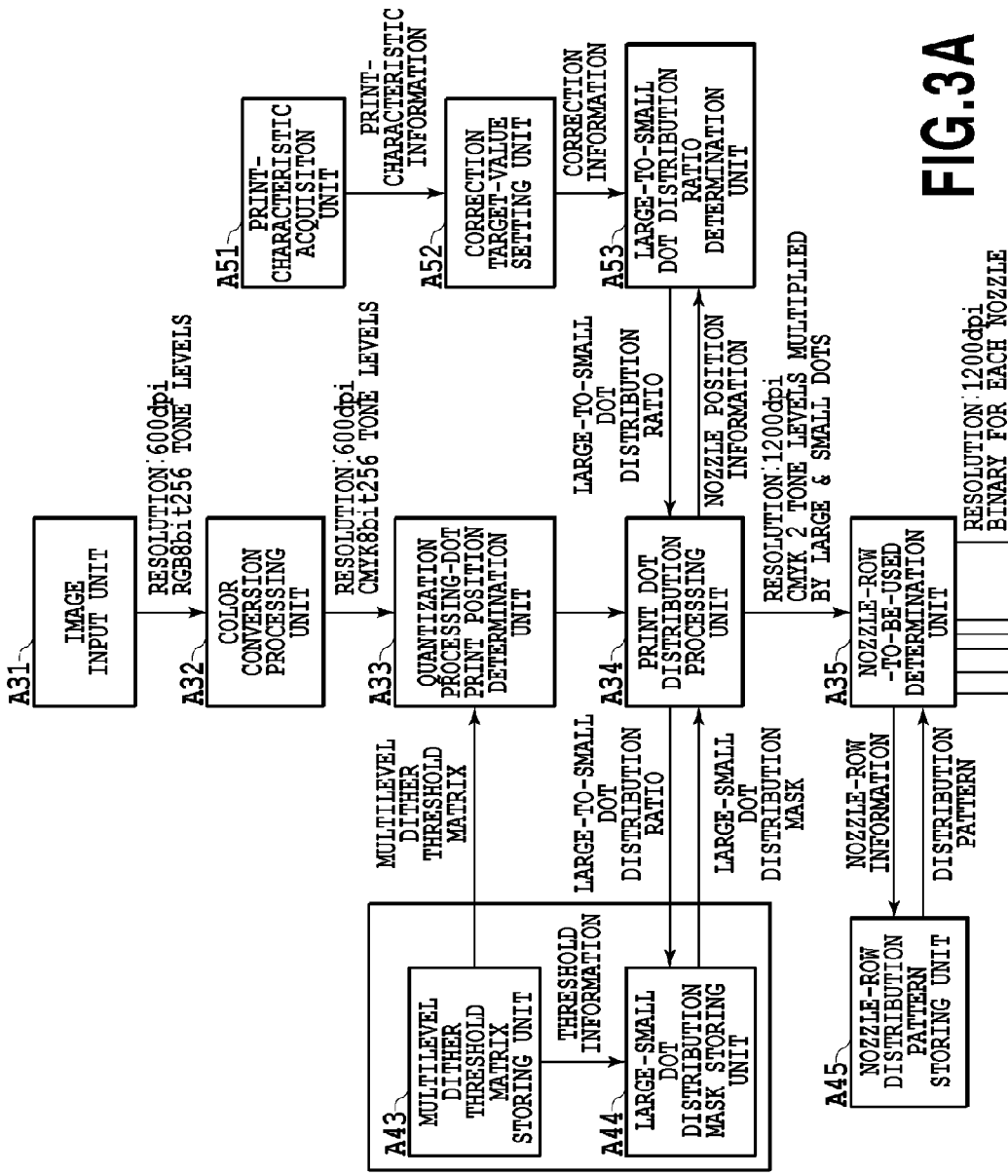

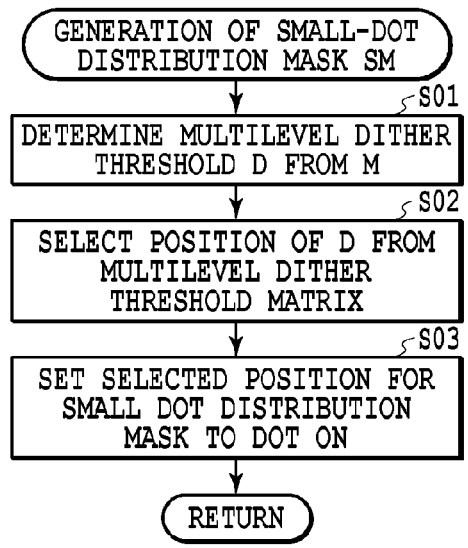
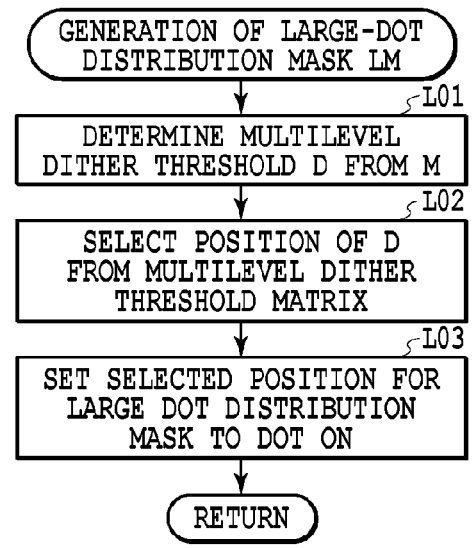
FIG.5C
FIG.5D

| 31 | 91 | 203 | 143 | 15 | 83 | 195 | 151 |
|---|---|---|---|---|---|---|---|
| 131 | 231 | 87 | 51 | 139 | 223 | 79 | 27 |
| 127 | 3 | 251 | 159 | 119 | 19 | 187 | 215 |
| 219 | 183 | 55 | 107 | 163 | 239 | 95 | 35 |
| 71 | 59 | 179 | 247 | 39 | 115 | 243 | 175 |
| 235 | 191 | 23 | 67 | 211 | 135 | 7 | 75 |
| 103 | 11 | 155 | 207 | 63 | 99 | 147 | 255 |
| 227 | 167 | 47 | 123 | 171 | 199 | 111 | 43 |

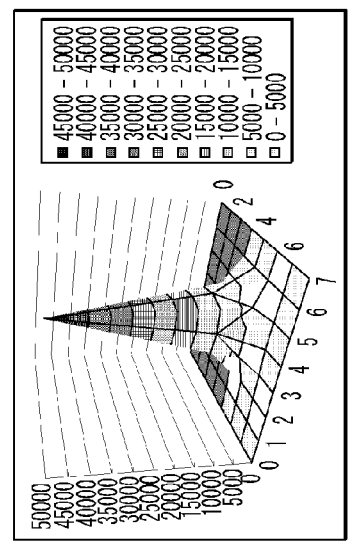
FIG.9A
FIG.9B
SINGLE DOT POTENTIAL(4,4) (4,4)=50000,
10000/(DISTANCE)⁴ AT OTHER POINTS
|   | 0 | 1 | 2 | 3 | 4 | 5 | 6 | 7 |
|---|---|---|---|---|---|---|---|---|
| 0 | 9 | 16 | 25 | 34 | 39 | 34 | 25 | 16 |
| 1 | 16 | 30 | 59 | 100 | 123 | 100 | 59 | 30 |
| 2 | 25 | 59 | 156 | 400 | 625 | 400 | 156 | 59 |
| 3 | 34 | 100 | 400 | 2500 | 10000 | 2500 | 400 | 100 |
| 4 | 39 | 123 | 625 | 10000 | 50000 | 10000 | 625 | 123 |
| 5 | 34 | 100 | 400 | 2500 | 10000 | 2500 | 400 | 100 |
| 6 | 25 | 59 | 156 | 400 | 625 | 400 | 156 | 59 |
| 7 | 16 | 30 | 59 | 100 | 123 | 100 | 59 | 30 |
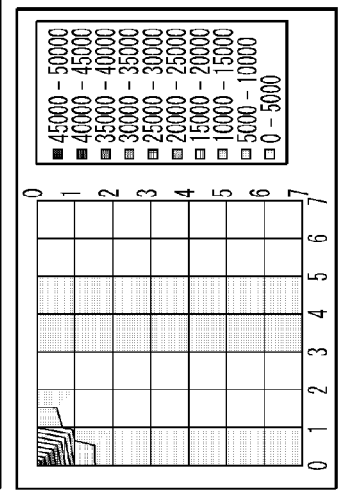
FIG.9C
FIG.9D
SINGLE DOT POTENTIAL(0,0) (0,0)=50000,
10000/(DISTANCE)⁴ AT OTHER POINTS
|   | 0 | 1 | 2 | 3 | 4 | 5 | 6 | 7 |
|---|---|---|---|---|---|---|---|---|
| 0 | 50000 | 10000 | 625 | 123 | 39 | 16 | 7 | 4 |
| 1 | 10000 | 2500 | 400 | 100 | 34 | 14 | 7 | 4 |
| 2 | 625 | 400 | 156 | 59 | 25 | 11 | 6 | 3 |
| 3 | 123 | 100 | 59 | 30 | 16 | 8 | 5 | 2 |
| 4 | 39 | 34 | 25 | 16 | 9 | 5 | 3 | 2 |
| 5 | 16 | 14 | 11 | 8 | 5 | 4 | 2 | 1 |
| 6 | 7 | 7 | 6 | 4 | 3 | 2 | 2 | 1 |
| 7 | 4 | 4 | 3 | 2 | 2 | 1 | 1 | 1 |
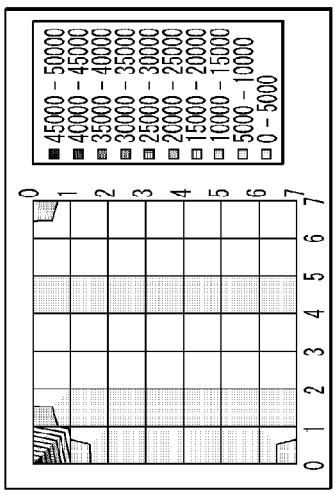
FIG.9E
FIG.9F
SINGLE DOT POTENTIAL(0,0)
ON BOUNDARY CONDITIONS
|   | 0 | 1 | 2 | 3 | 4 | 5 | 6 | 7 |
|---|---|---|---|---|---|---|---|---|
| 0 | 50004 | 10006 | 635 | 141 | 80 | 141 | 635 | 10006 |
| 1 | 10006 | 2506 | 410 | 116 | 72 | 116 | 410 | 2506 |
| 2 | 635 | 410 | 169 | 76 | 54 | 76 | 169 | 410 |
| 3 | 141 | 116 | 76 | 49 | 42 | 49 | 76 | 116 |
| 4 | 80 | 72 | 54 | 42 | 36 | 42 | 54 | 72 |
| 5 | 141 | 116 | 76 | 49 | 42 | 49 | 76 | 116 |
| 6 | 635 | 410 | 169 | 76 | 54 | 76 | 169 | 410 |
| 7 | 10006 | 2506 | 410 | 116 | 72 | 116 | 410 | 2506 |

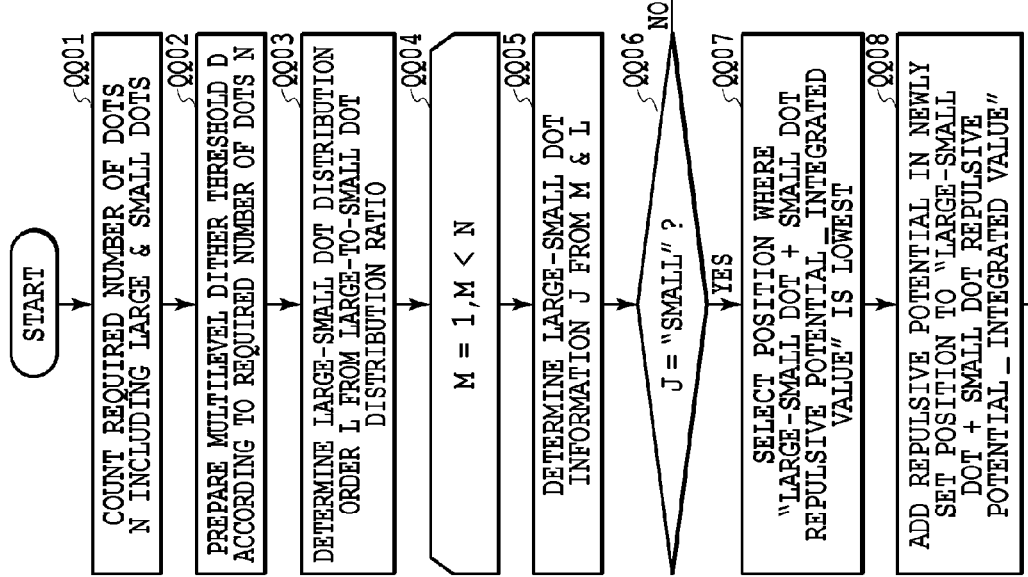

PRINTING DEVICE AND PRINTING METHOD

BACKGROUND OF THE INVENTION

1. Field of the Invention

This invention relates to a printing device and a printing method for correcting density variations resulting from differences in printing characteristics between predetermined portions of a plurality of nozzles.

2. Description of the Related Art

Inkjet printing devices comprise a plurality of nozzles provided in a print head for ink ejection and eject ink drops from the nozzles onto a print medium to print characters and images. In such printing devices, if there is a difference in printing characteristics, for example, the amount of ink used to print, between the nozzles, density variations may be liable to occur on a printed image, causing degradation of image quality. This phenomenon is more distinguished when, in particular, in a line head in which a print head comprises a plurality of print chips, the adjacent print chips differ in printing characteristics from each other. For overcoming this phenomenon, U.S. Pat. No. 7,249,815 discloses a printing device comprising a plurality of nozzles arranged according to a predetermined distribution and differing in drop volume, wherein an average ink drop volume is provided by selectively driving the selected nozzles such that an actual value of an average drop volume becomes equal to a target value.

SUMMARY OF THE INVENTION

However, the printing device according to U.S. Pat. No. 7,249,815 corrects the density of a printed image, but brings about a change in a dot pattern. This is because positions of dots printed on a print medium differ between the nozzles selected for providing the average ink drop volume and the other nozzles. For this reason, making a significant correction above a certain level results successfully in density correction but disadvantageously in visual recognition of difference in a dot pattern, leading to degradation in image quality (for example, grain visibility). On the other hand, if maintenance in image quality is chosen, this gives rise to a disadvantageous problem of a limited range that the printing characteristics can be corrected.

It is an object of the present invention to provide a printing device and a printing method which are capable of making a correction for density variations which result from differences in printing characteristics between predetermined nozzles and also achieving an extended range that the printing characteristics can be corrected while maintaining image quality without degradation of the image quality caused by a difference in a dot pattern which is associated with the correction.

To attain this object, the present invention provides a printing device capable of using a print head ejecting ink from a plurality of nozzles to print ink dots of a plurality of dot diameters on a print medium, which comprises:

a print-characteristic acquisition unit configured to obtain print characteristic information on dot diameters of ink dots to be printed from predetermined portion to predetermined portion of the plurality of nozzles;

a distribution ratio determination unit configured to determine a distribution ratio for distributing image data to the predetermined portions of the plurality of nozzles on the basis of the print characteristic information;

a dot print position determination unit configured to quantize the image data on the basis of the image data and sizes and an array of thresholds for determining a dot print position; and a plurality of mask units configured to be based on the dot distribution order determined in accordance with the distribution ratio, and to distribute printing of each of the ink dots of the plurality of dot diameters to the dot print position determined by the dot print position determination unit.

To attain this object, the present invention provides a printing method employed by a printing device capable of using a print head ejecting ink from the plurality of nozzles to print ink dots of a plurality of dot diameters on a print medium, which comprises:

a print-characteristic acquisition step of obtaining print characteristic information on dot diameters of ink dots to be printed from predetermined portion to predetermined portion of the plurality of nozzles;

a distribution ratio determination step of determining a distribution ratio for distributing image data to the predetermined portions of the plurality of nozzles on the basis of the print characteristic information;

a dot print position determination step of quantizing the image data on the basis of the image data and sizes and an array of thresholds for determining a dot print position; and a plurality of mask steps of being based on the dot distribution order determined in accordance with the distribution ratio, and of distributing printing of each of the ink dots of the plurality of dot diameters to the dot print position determined by the dot print position determination step.

The present invention is designed to improve degradation of image quality in an image printing method and an image printing device of correcting density variations resulting from differences in printing characteristics between predetermined portions of a nozzle group. The image printing method and the image printing device according to the present invention are capable of improving degradation of image quality (for example, grain visibility) which is caused by a visual detection of differences in the print density and print pattern which are caused by variations in printing characteristics between predetermined portions of a nozzle group.

Further features of the present invention will become apparent from the following description of exemplary embodiments (with reference to the attached drawings)

BRIEF DESCRIPTION OF THE DRAWINGS

FIG. 3 is a diagram showing the relationship between FIGS. 3A and 3B;

FIG. 3A is a schematic diagram of image processing in a first embodiment;

FIGS. 5B to 5D are flowcharts illustrating exemplary methods for generating a large-small dot distribution mask;

FIGS. 8A to 8C are diagrams illustrating the process of generating the large-small dot distribution mask according to the first embodiment;

FIGS. 9A to 9F are tables and diagrams illustrating repulsive potential used for generating the multilevel dither threshold matrix according to the first embodiment;

FIG. 14 is a diagram showing the relationship between FIGS. 14A and 14B;

FIG. 14A is a flowchart illustrating an exemplary method for generating a multilevel dither threshold matrix according to a third embodiment.

DESCRIPTION OF THE EMBODIMENTS

Exemplary embodiments according to the present invention will be described below with reference to the accompanying drawings.

First Embodiment

Line Printer Overview

Figure 1:
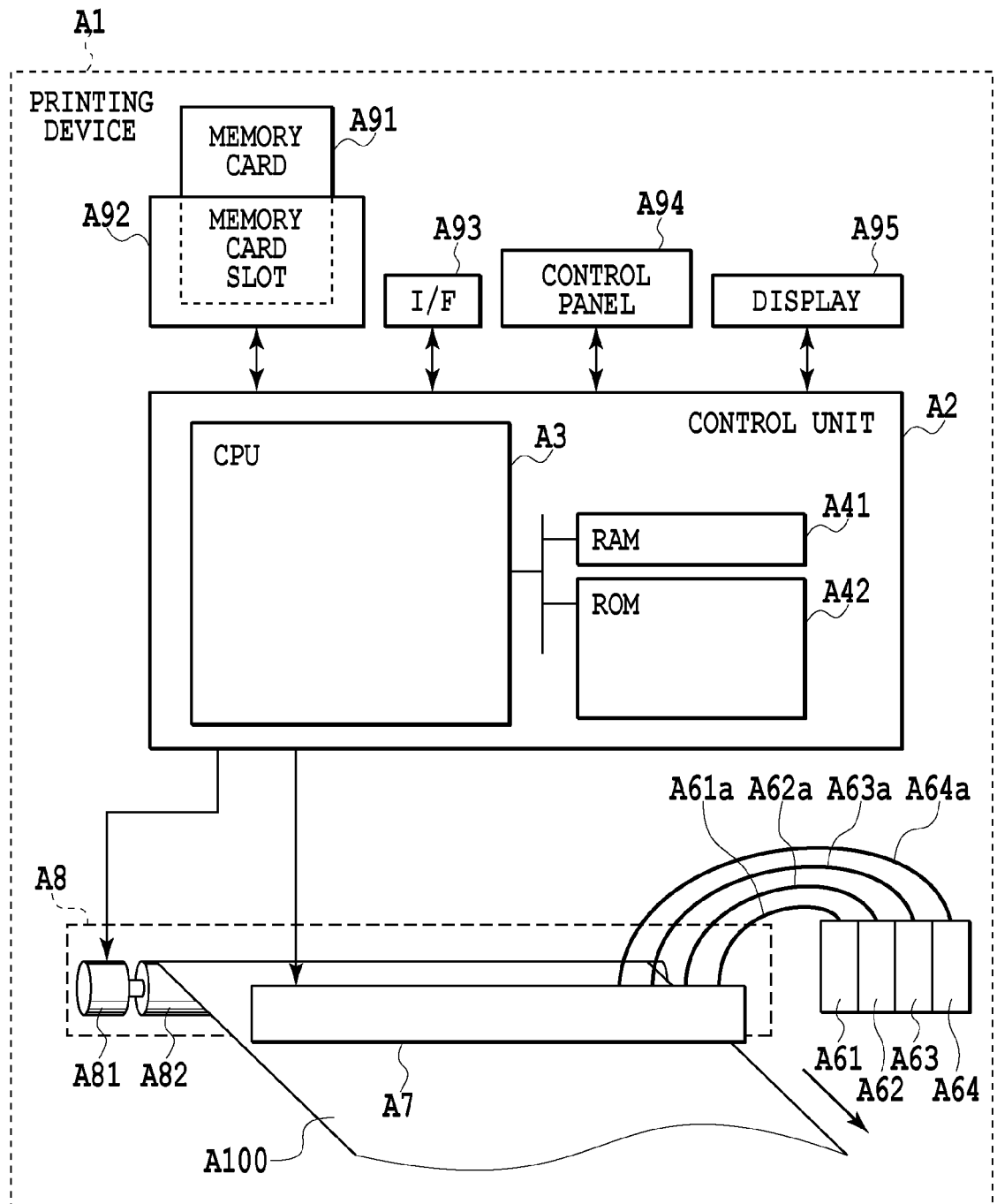
FIG. 1 is a schematic block diagram illustrating the structure of a printing device A1 according to an embodiment of the present invention.

FIG. 1 is a schematic diagram illustrating the structure of a printing device A1 in an embodiment according to the present invention. The printing device A1 is an inkjet line printer, which comprises a control unit A2, ink cartridges A61 to A64, a print head A7, a print medium conveying mechanism A8 and the like, as shown in FIG. 1. The ink cartridges A61 to A64 include cyan, magenta, yellow and black inks, respectively.

The print head A7 is a print head of a line head type and includes a plurality of thermal nozzles arranged on the surface facing a print medium in a direction perpendicular to the conveying direction. The inks included in the respective ink cartridges A61 to A64 are supplied through ink introducing tubes A61a to A64a to the nozzles which are arranged on the surface of the print head facing the print medium. Then, the inks are ejected from the nozzles onto a print medium A100 for printing. The print head A7 will be described in detail with reference to FIG. 2A.

The print-medium conveying mechanism A8 includes a medium feeding motor A81 and a medium feeding roller A82. The medium feeding motor A81 rotates the medium feeding roller A82 to convey the print medium A100 to a position of the print head A7 in a direction perpendicular to the medium feeding roller A82.

The control unit A2 comprises a CPU (A3), a RAM (A41) and a ROM (A42) and controls operations of the print head A7 and the medium feeding roller A81 described above. The CPU (A3) loads control programs stored in the ROM (A42) into the RAM (A41) and executes it to apply various types of processing to an image, to generate data on an image to be printed by use of the print head A7, perform control on the print-medium conveying mechanism A8, and the like.

Figure 2A:
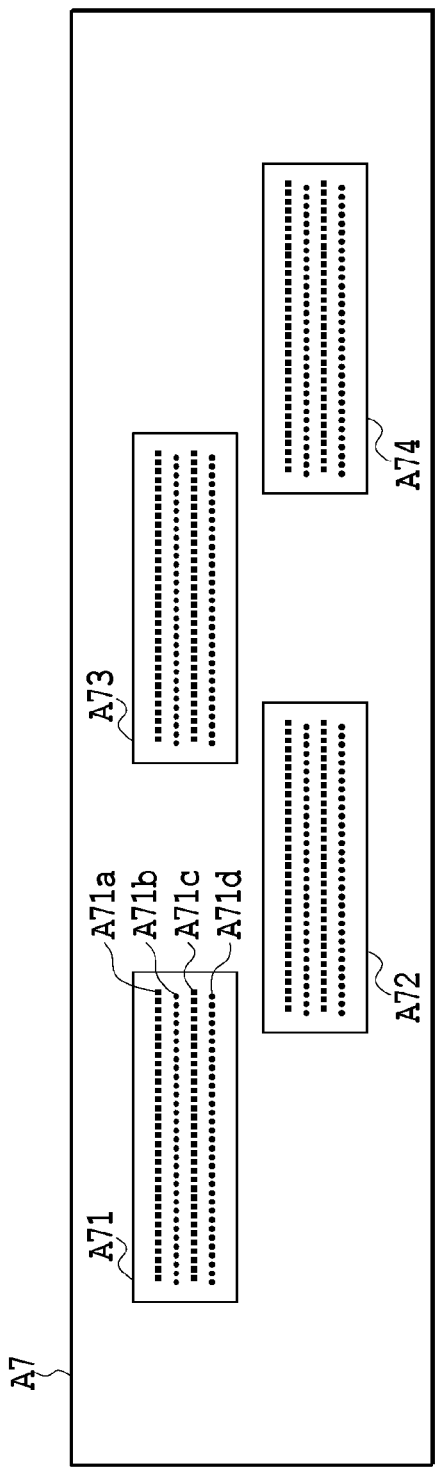
FIG. 2A is an illustrative diagram showing the structure of a print head A7 in detail.

FIG. 2A is a diagram illustrating the structure of the print head A7 in detail. As shown in FIG. 2A, the print head A7 according to the embodiment includes a plurality of nozzle rows having different printing characteristics. Each of the nozzles in the nozzle rows A71a and A71c prints a dot of a larger dot diameter, and each of the nozzles in the nozzle rows A71b and A71d prints a dot of a smaller dot diameter. Print chips A71 to A74 having a plurality of such nozzle rows are arranged in a staggered pattern to form the print head A7. Adjusting medium feeding and ink-ejection timing causes ink drops ejected from the print chips to form print dots on the same column on the print medium. Note that the present embodiment describes the print chips A71 to A74 arranged in a staggered pattern, but the print chips may be arranged in line with each other.

Figure 2B:
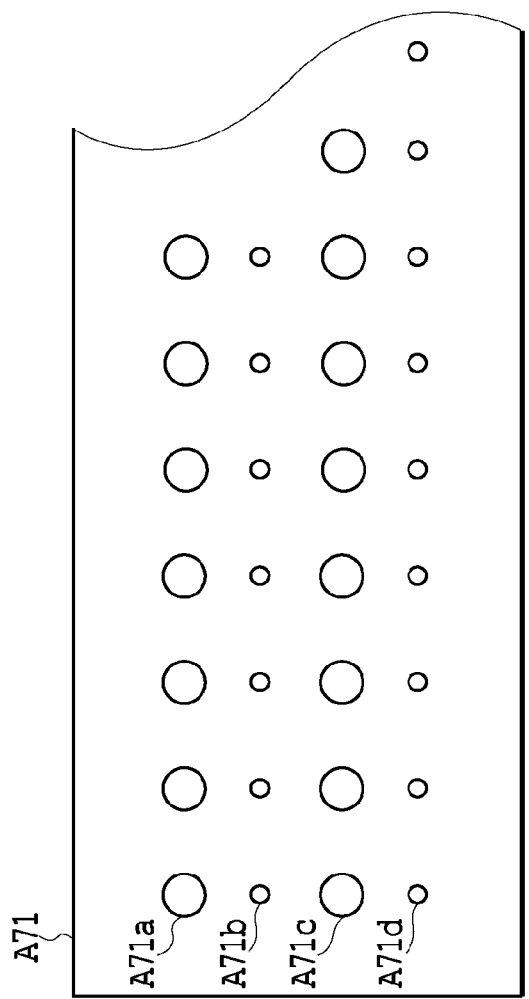
FIG. 2B is an illustrative diagram showing a print chip A71 forming a part of the print head A7.

FIG. 2B is a diagram illustrating the print chip 71A forming part of the print head A7. The print chip A71 includes the nozzle rows A71a, A71b, A71c and A71d such that dots of at least two dot diameters or more can be printed. In the present embodiment, each nozzle row is defined as a unit such that the different print characteristics are assigned on a nozzle-row by nozzle-row basis, and the print chip is configured to have two nozzle rows for each of the different print characteristics, such as the nozzle rows A71a and A71c designed to produce dots of a relatively larger dot diameter and the nozzle rows A71b and A71d designed to produce dots of a relatively smaller dot diameter. However, the number of nozzle rows differing in print characteristics is not limited to this. For example, a print chip may have a nozzle row for each print characteristic. A unit in which the different print characteristics are assigned is not limited to a nozzle-row unit, and may be a nozzle-group unit in which the nozzles are arranged in a two-dimensional zigzag pattern or the like or may be a nozzle unit. The printing device A1 according to the present embodiment is configured to employ a thermal print head, but the invention is not limited thereto. The printing device A1 may equally employ any line head if it includes a plurality of print chips arranged in a direction perpendicular to the conveying direction and forms print dots with a plurality of print characteristics on the same raster to print image data. For example, another ink-ejection type inkjet print head using a piezoelectric technology may be employed. In addition, a print head capable of printing print dots having a plurality of different print characteristics from a nozzle may be employed as long as it is capable of printing print dots having different print characteristics. The present embodiment describes the case of the "print characteristic" being an ink-ejection amount, but the invention is not limited thereto. For example, the print characteristics may be defined in relation to a dot diameter of a printed ink dot, such as an ink-drop ejection speed (kinetic energy) or the like. Further, inks of any colors other than the aforementioned C, M, Y and K colors may be employed.

In the present specification, the dot diameters of dots printed on the print medium by ink ejected from nozzles in a nozzle row are classified as a relatively large dot diameter and a relatively small dot diameter, and therefore a nozzle row for printing a dot of a relatively large dot diameter is called a "large nozzle row", while a nozzle row for printing a dot of a relatively small dot diameter is called a "small nozzle row". In addition, the dot of the relatively large dot diameter is called the "large dot", while the dot of the relatively small dot diameter is called the "small dot". The large dot and the small dot are collectively called the "large-and-small dots" or "large-small dot".

<Overview of Image Processing Unit>

Figure 3B:
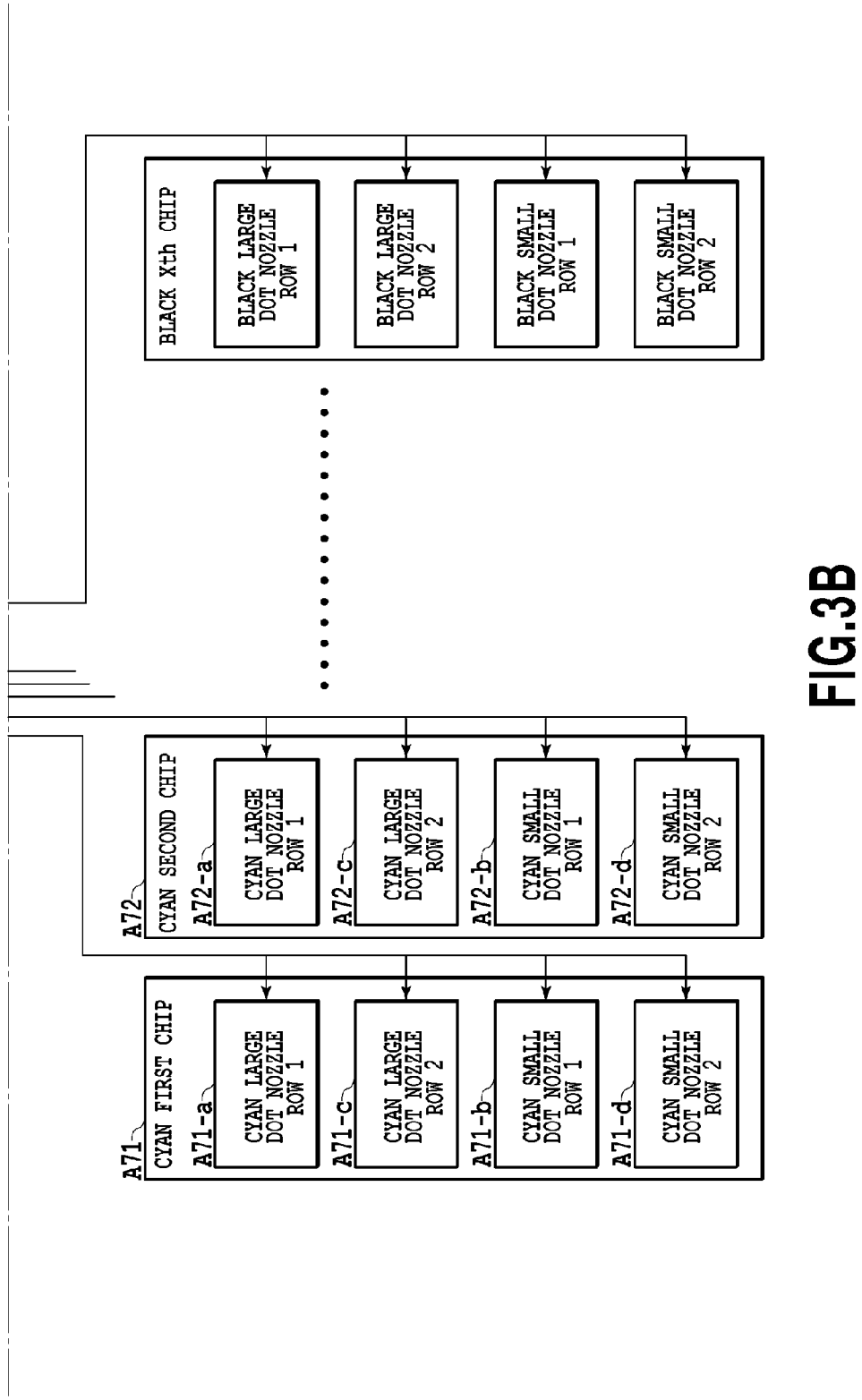
FIG. 3B is a schematic diagram of image processing in a first embodiment.
Figures 4A, 4B:
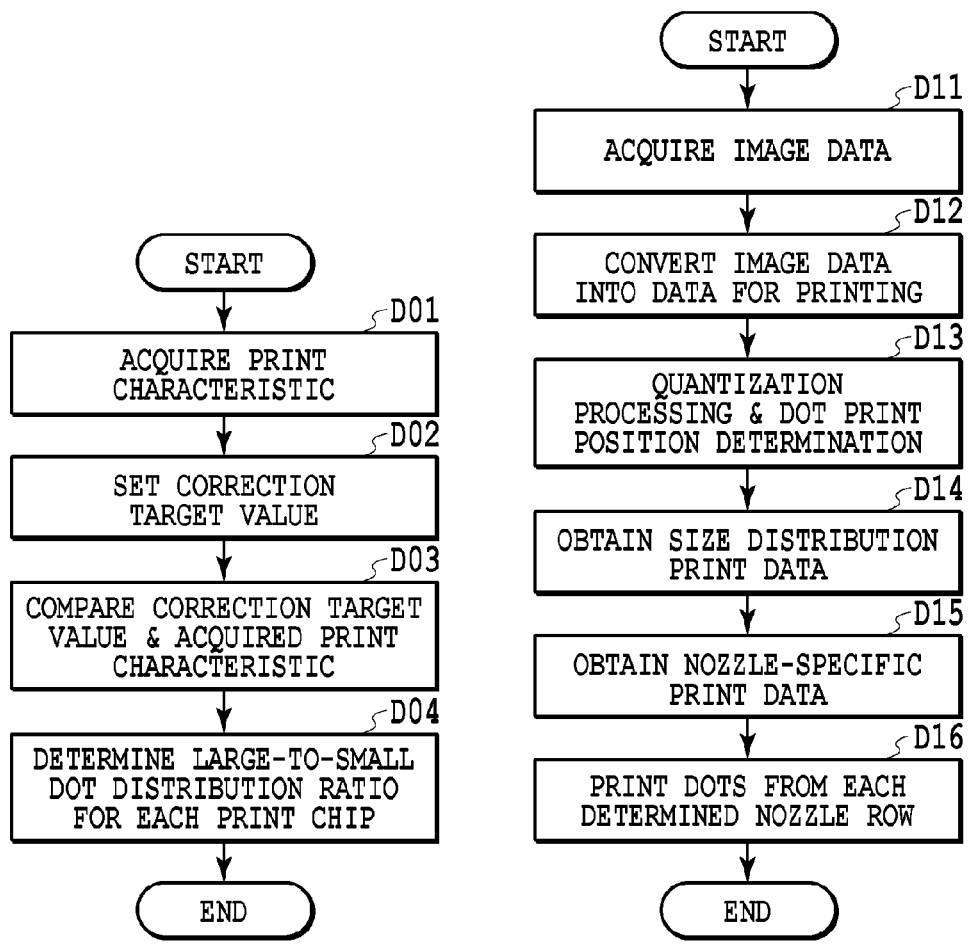
FIGS. 4A and 4B are flowcharts of the steps in the first embodiment.

FIG. 3 is a schematic diagram showing the image processing in the present embodiment. FIG. 4A and FIG. 4B are flowcharts illustrating the processing steps. In the present embodiment, the amount of ink ejected from each of the print chips (A71, A72, A73, A74) of the print head A7 (hereinafter referred to as an "ejection amount") is used as a value representing a print characteristic.

The operation process in the present embodiment will be described with reference to FIG. 3, FIG. 4A and FIG. 4B.

First, a description is given based on the process in FIG. 4A. At step D01 in FIG. 4A, the print device A1 uses a print-characteristic acquisition unit A51 in FIG. 3 to obtain ejection-amount information of the large nozzle rows (A71$a$ and A71$c$ in the print chip A71) and the small nozzle rows (A71$b$ and A71$d$ in the print chip A71) in each of the print chips A71 to A74.

Next, at step D02 in FIG. 4A. the print device A1 uses a correction target value setting unit A52 to set an amount of target ejection from each of the print chips A71 to A74 for print (hereinafter referred to as a "correction target ejection amount").

Then, at steps D03 and D04 in FIG. 4A, the print device A1 uses a large-to-small dot distribution ratio determination unit A53 to perform a comparison between the ejection amount read from the individual print chips and the correction target ejection amount thus set, and then to determine a distribution ratio for printing large dots and small dots in different ejection amounts. In the present embodiment, the ejection-amount information obtained at step D01 is assumed to indicate that an average ejection amount of each nozzle in the nozzle rows A71$a$ and A71$c$ is 3 ng, and an average ejection amount of each nozzle in the nozzle rows A71$b$ and A71$d$ is 2 ng. The correction target ejection amount set at step D02 is assumed to be 2.5 ng. The distribution ratio of print dots produced by the print chip A71, which is determined at steps D03 and D04, is assumed to be large dot (3 mg): small dot (2 ng)=1:1. Based on the distribution ratio of 1:1, the large dots and the small dots are to be printed in equal numbers.

Next, the process in FIG. 4B will be described. FIG. 4B is a flowchart showing the steps of the printing device A1 applying predetermined image processing to image data stored on a memory card A91 to perform the processing of converting the image data to dot data indicating the presence or absence of dots for printing. Upon start of the image printing processing, at step D11 in FIG. 4B, the control unit A2 operates an image input unit A31 to read the image data to be printed from the memory card A91. The description is given on the assumption that the image data is a color image of R, G, and B, each color having 8 bits and 256 tone levels at a resolution of 600 dpi. However, the present invention is applicable equally not only to a color image but also to a monochrome image.

Then, at step D12 in FIG. 4B, a color conversion processing unit A32 performs color conversion processing for conversion to CMYK, each color having 8 bits and 256 tone levels at a resolution of 600 dpi. The color conversion processing is for converting a RGB color image shown by a combination of respective tone values of RGB colors to data represented by tone values of the respective colors used for printing. As described earlier, the printing device A1 uses inks of four colors of CMYK to print an image. Accordingly, the color conversion processing unit according to the present embodiment performs the processing of converting the RGB image data to data represented by tone values of the respective CMYK colors.

Then, a quantization processing-dot print position determination unit A33 is operated to perform the quantization processing and determine a dot print position. In this case, the "quantization processing" is the processing of reducing the image data having 8 bits and the large tone number of 256 tone levels to a lower number of tone levels appropriate to the printing capability of the printing device A1. The "dot print position determination processing" is the processing of determining printed-dot placement within a print pixel from the image data quantized to lower tone levels by each print pixel. The quantization processing-dot print position determination unit A33 reads a multilevel dither threshold matrix from a multilevel dither threshold matrix storing unit A43, and then uses the threshold matrix and the image data to perform the quantization processing and the dot print position determination processing.

Then, at step D14 in FIG. 4B, a print dot distribution processing unit A34 is operated to perform large-small dot distribution processing on the print data. In this case, the "print dot distribution processing" includes the following series of steps. Specifically, the print dot distribution processing unit A34 initially transmits the information on nozzle positions for printing the print dots (by which print chip the print dots are printed in the present embodiment) to the large-to-small dot distribution ratio determination unit A53 in FIG. 3. The print dot distribution processing unit A34 receives, from the large-to-small dot distribution ratio determination unit A53, distribution ratio information determined depending on the print characteristic information of the print chip as described earlier. Then, the print dot distribution processing unit A34 transmits the received distribution ratio information to the large-small dot distribution mask storing unit A44 to obtain a large-small dot distribution mask from the large-small dot distribution mask storing unit A44. The print dot distribution processing unit A34 uses the obtained large-small dot distribution mask to assign print dots having different print characteristics (the ejection amount in the present embodiment) on a print-dot position basis for generating respective print data. In the present embodiment, the print dot distribution processing unit A34 performs the print dot distribution processing to obtain binary print data at a resolution of 1200 dpi about each of the large and small dots distributed to achieve a 1:1 ratio between the numbers of print dots of two sizes respectively resulting from the ejection amounts of 3 ng and 2 ng (hereinafter referred to as "size distribution print data").

Then, at step D15 in FIG. 4B, a nozzle-row-to-be-used determination unit A35 in FIG. 3 determines nozzle rows to be used as described below. Specifically, the nozzle-row-to-be-used determination unit A35 transmits nozzle-row information about which nozzle row is used to print the size distribution print data to the nozzle row distribution pattern storing unit A45 in FIG. 3. The nozzle-row-to-be-used determination unit A35 acquires the distribution pattern to the pertinent nozzle rows from the nozzle row distribution pattern storing unit A45. The nozzle-row-to-be-used determination unit A35 generates, based on the distribution pattern and the size distribution print data, print data (binary at 1200 dpi) to be printed by each of the nozzle rows (A71$a$ to A71$d$ in FIG.

2B) having different print characteristics (hereinafter referred to as "nozzle-row-specific print data"). Because the present embodiment employs the two large nozzle rows and the two small nozzle rows, the nozzle row distribution pattern data is used to divide the size distribution print data into two to generate nozzle-specific print data.

Then, at step D16 in FIG. 4B, the nozzle-row-specific print data generated for each nozzle row is transmitted to the nozzle row (A71a, A71b, A71c, A71d in FIG. 2B) having each print characteristic in each print chip to form a plurality of print dots having the different print characteristics on the print medium to print an image. The nozzles have different print characteristics on a nozzle-row by nozzle-row basis as described earlier, but the present invention is not so limited. For example, the unit in which the different print characteristics are assigned may be set with consideration of a difference in print characteristics between predetermined portions of the plurality of nozzles such as nozzle groups or nozzles arranged in a zigzag pattern or the like.

<Method for Generating Multilevel Dither Threshold Matrix>

Figure 5A:
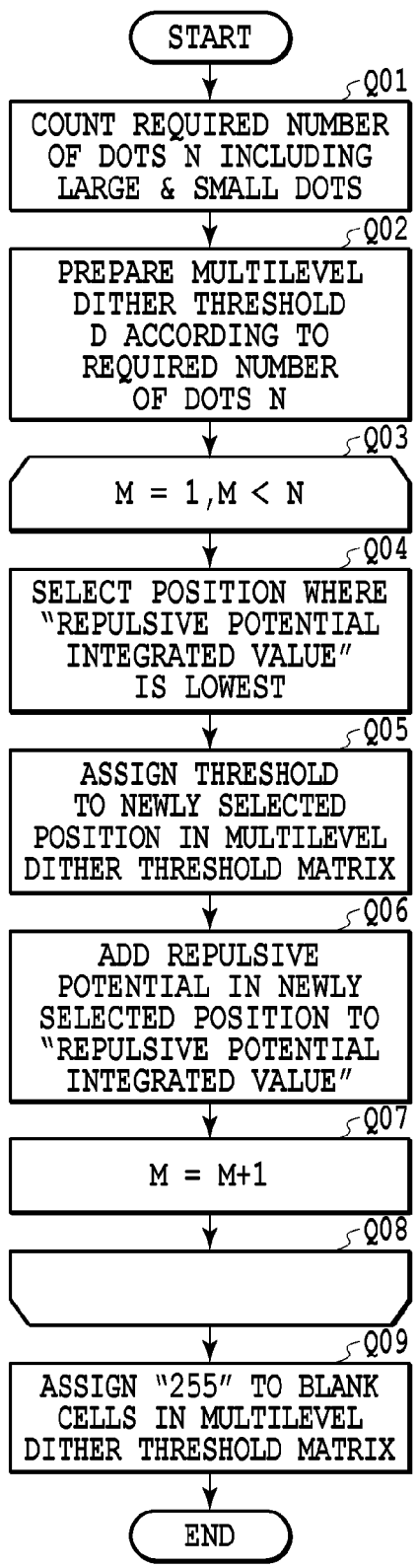
FIG. 5A is a flowchart of the steps for generating a multi-level dither threshold matrix according to the first embodiment.
Figure 6A:
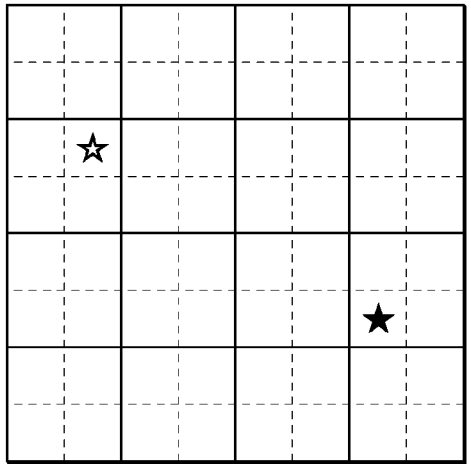
FIGS. 6A to 6C are diagrams illustrating the process of generating the multilevel dither threshold matrix according to the first embodiment.
Figure 6B:
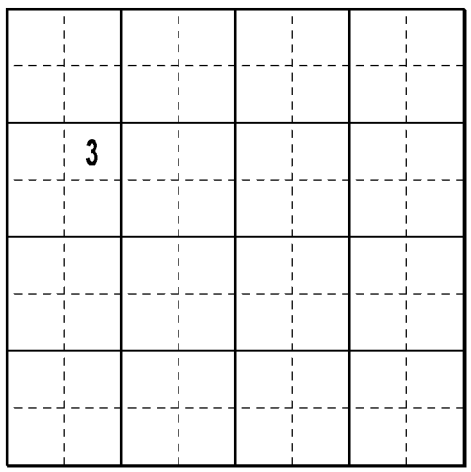
Figure 6C:
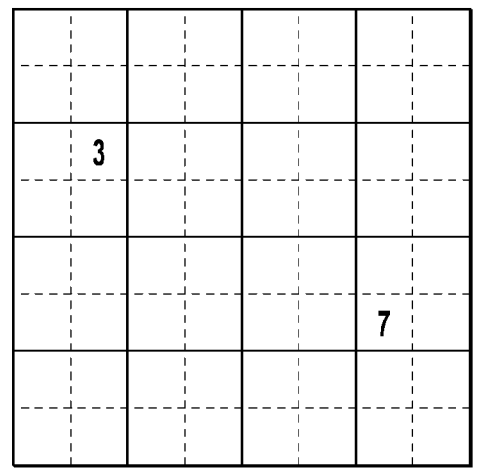

A method of generating a multilevel dither threshold matrix used in the quantization processing and the dot print position determination described in step D13 will be described in detail with reference to FIG. 5A and FIGS. 6A to 6C. FIG. 5A shows the steps of generating a multilevel dither threshold matrix. FIGS. 6A to 6C show an exemplary process of generating the multilevel dither threshold matrix.

At step Q01 in FIG. 5A, a required number of dots N, which is the sum of the large and small dots produced within a size of a pattern to be generated, is counted. The present embodiment shows an example that 64 dots (N=64) of a combination of the large and small dots are arranged within a pattern size of 8×8=64 pixels at a 1200 dpi resolution. Then, at step Q02, multilevel dither thresholds D are prepared according to the required number of dots N of the combination of large and small dots. In the present embodiment, image data to which the quantization processing is applied has 256 tone levels. The tone levels from zero to 255 are divided into 64 in order to arrange the 64 dots (N=64) of the combination of large and small dots. As a result, the multilevel dither thresholds result in an arithmetic progression {3, 7, 11, 15, ..., 255} with 64 terms in total of which the initial term is 3 and each constant increment is 4. The multilevel dither thresholds are assigned in order as follows to generate a multilevel dither threshold matrix. At this stage, if the order in which the multilevel dither thresholds are assigned is M, M results in an integer of 1≤M≤N (in which N=64).

The steps between step Q03 and step Q08 are repeated until M increases to immediately before N, that is, during 1≤M<N. At step Q04, a position where a "repulsive potential_integrated value" is lowest is selected from 8×8 matrix cells showing 64 pixels. Regarding the first position, because a position selection is not made until now and the "repulsive potential" does not occur, the "repulsive potential_integrated value" which is obtained by integrating repulsive potential values is "zero" even in any position. As a result, an arbitrary position is selected. In this example, it is assumed that the position indicated with a white star-shaped symbol in FIG. 6A is selected. At step Q05, the threshold prepared in step Q02 is set in the selected position (indicated with the white star-shaped symbol) in the multilevel dither threshold matrix (FIG. 6B). Then, at step Q06, the repulsive potential in the selected position is added to the "repulsive potential_integrated value". Then, the process proceeds to step Q07 to add 1 to M, and then to step Q08 to return to step Q03.

The repulsive potential used for arranging the thresholds in the matrix in the present embodiment will be described with reference to FIGS. 9A to 9F. In the present embodiment, for the purpose of obtaining steeper repulsive potential around the position assigned with a threshold, isotropic repulsive potential, which is "50000" at the center of the assigned position and 10000 by (distance)$^4$ at other points, is used. FIG. 9A is a graph of the repulsive potential, while FIG. 9B is a table of the repulsive potential at X-coordinates 0 to 7 in the horizontal axis and Y-coordinates 0 to 7 in the vertical axis. As clear from FIGS. 9A and 9B, if a threshold is assigned to a coordinate position (4, 4), the steep potential occurs around the position. FIGS. 9C and 9D show the potential occurring when the center of the potential in FIGS. 9A and 9B is moved to a coordinate position (0, 0). If the repulsive potential in FIGS. 9C and 9D is Pot_alone, the repulsive potential in a coordinate position (x, y) is Pot_alone=50000(in the case of $x$=0,$y$=0), 10000÷$(x^2+y^2)^2$(in the case of $x$≠0,$y$≠0).

To satisfy the boundary conditions, assuming that the same pattern continues in the upward, downward, rightward and leftward directions including an oblique direction, repulsive potential Pot_0 (x, y) in a coordinate position (x, y) when a threshold is assigned to a coordinate position (0, 0) is $$Pot\_0(x, y) = Pot\_alone\,(x + array\_X, y + array\_Y) +$$
$$Pot\_alone\,(x, y + array\_Y) + Pot\_alone\,(x - array\_X, y + array\_Y) +$$
$$Pot\_alone\,(x + array\_X, y) + Pot\_alone\,(x, y) +$$
$$Pot\_alone\,(x - array\_X, y) + Pot\_alone\,(X + array\_X, y - array\_Y) +$$
$$Pot\_alone\,(x, y - array\_Y) + Pot\_alone\,(x - array\_X, y - array\_Y),$$

wherein array_X is a size of X in X×Y print dot pattern (8 in the present embodiment), and array_Y is a size of Y in X×Y print dot pattern (8 in the present embodiment). The repulsive potential state at this stage is shown in FIGS. 9E and 9F. For repulsive potential Pot_ab(x,y) in a coordinate position (x, y) when a threshold is assigned to an arbitrary coordinate position (a, b), a relative position from the coordinate position (a, b) can be substituted into the above-described Pot_0($x,y$). Accordingly, the repulsive potential is Pot__ab($x,y$)=Pot_0(Pos__$x$,Pos__$y$), wherein Pos_x=x−a (in the case of x≥a), a−x (in the case of x<a),
Pos_y=y−b (in the case of y≥b), b−y (in the case of y<b).

Continuously, assignment of a second threshold will be described. At step Q03 in FIG. 5A, M=2(<N) is determined. Then, at step Q04, the position where the "repulsive potential_integrated value" is lowest is selected from 8×8 matrix cells. In this example, it is assumed that the position indicated with a black solid star-shaped symbol in FIG. 6A is selected. Then, at step Q05, the threshold prepared in step Q02 is set in the selected position (indicated with the black solid star-shaped symbol) in the multilevel dither threshold matrix (FIG. 6C). Then, at step Q06, the repulsive potential in the selected position is added to the "repulsive potential_integrated value". Then, the process proceeds to step Q07 to add 1 to M, and then to step Q08 to return to step Q03. After that, the steps Q03 to Q08 are repeated during M<N. Eventually, when N and M become equal, "255" is assigned to all the blank cells in the multilevel dither threshold matrix to prevent output of print dots. By the above-described steps, a multi-level dither threshold matrix is generated.

The multilevel dither threshold matrix described in the present embodiment may be generated together with the large-small dot distribution mask based on the distribution ratio information or may be stored from the beginning for assignment.

<Method for Generating Large-Small Dot Distribution Mask>

Figure 5B:
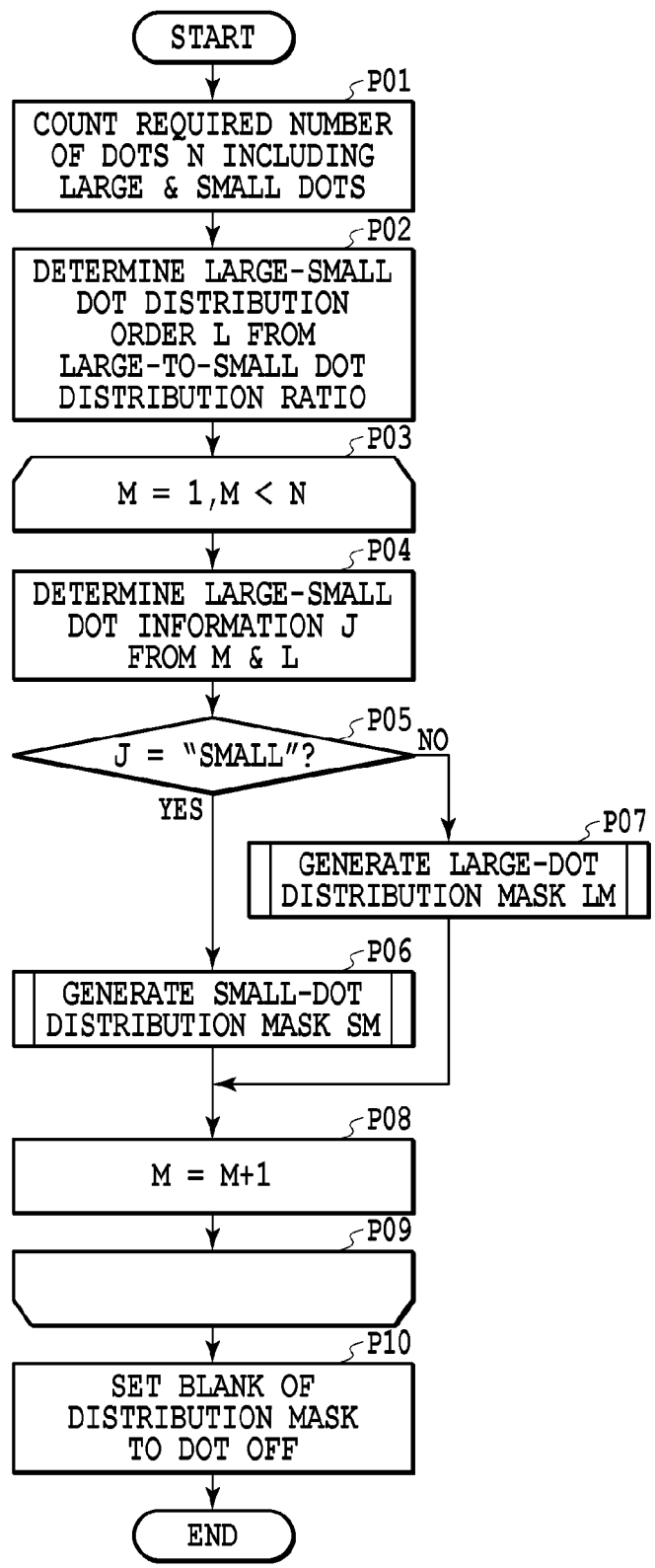

In the present embodiment, the large-small dot distribution mask used for generating the print data concerning the large and small dots corresponds to the multilevel dither threshold matrix and is identical in size with it. The method of generating the large-small dot distribution mask will be described in detail with reference to FIGS. 5B to 5D, FIGS. 7A to 7E and FIGS. 8A to 8C. FIGS. 5B to 5D are flowcharts for generating a large-small dot distribution mask. FIGS. 7A to 7E are graphs showing the method of determining the order in which the large and small dots are distributed. FIGS. 8A to 8C show an example of the process of generating the large-small dot distribution mask.

Initially, at step P01 in FIG. 5B, a required number of dots N, which is the sum of the large and small dots produced within a size of a pattern to be generated, is counted. The present embodiment shows an example that 64 dots (N=64) of a combination of the large and small dots are arranged within a pattern size of 8×8=64 pixels at a 1200 dpi resolution.

Then, at step P02, large-small dot distribution order L is determined from the large-to-small dot distribution ratio. For example, if the large-to-small dot distribution ratio is 1:1, when the number of small dots is SD and the number of large dots is LD, a straight line of a target distribution ratio SD=LD can be drawn as shown in FIGS. 7A to 7D. A graph showing large-small dot distribution order is derived by use of square approximation or the like so as to minimize an error in an actual distribution ratio of the image data with respect to the straight line representing the target distribution ratios. When the large-to-small dot distribution ratio is 1:1, the large-small dot distribution order L is determined to be any of four sequences of the order of small→large→small→→large→ . . . in FIG. 7A, the order of large→small→large→small→ . . . in FIG. 7B, the order of small→large→large→small→ . . . in FIG. 7C, and the order of large→small→small→large→ . . . in FIG. 7D. For example, in the order of "small→large→small→large→ . . . ", a small dot is assigned as the first dot, and then a large dot, a small dot and then a large dot are assigned in this order. Subsequently, the assignment set is repeated to achieve the distribution. The case in FIG. 7A will be described below by way of example.

The steps from step P03 to step P09 in FIG. 5B are repeated while the condition of 1≤M<N is satisfied. First, at step P04, large-small dot information J (an $M^{th}$ dot in the distribution order L) is determined from the value of M and the large-small dot distribution order L (L means "small→large→small→large→ . . . " in the example) which has been determined step P02. Because, at this stage, M is equal to 1 and L is defined as the order of small→large→small→large→ . . . , the large-small dot information J is "small dot" (hereinafter referred to as "J=small"). Next, it is determined at step P05 whether or not J=small. Since J is small at this stage, the process proceeds to step P06 in which the processing to generate the small dot distribution mask which has been defined in another step is performed. Details of the processing are shown in FIG. 5C.

At step S01 in FIG. 5C, a corresponding multilevel dither threshold D is determined from values of M. The multilevel dither threshold D is the threshold prepared in step Q02 in FIG. 5A. The multilevel dither threshold D is selected in reducing order of threshold, which makes it possible to distribute positions where large dots and small dots occur in accordance with the multilevel dither threshold matrix. For this reason, the multilevel dither threshold D is selected in descending or ascending order. The first embodiment uses the selection of multilevel dither threshold in ascending order as an example. Because of M=1, the corresponding multilevel dither threshold becomes D=3. Then, at step S02, a position corresponding to the multilevel dither threshold D determined at step S01 is selected from the multilevel dither threshold matrix generated after the required number of dots N has been determined. In this example, the position of D=3 is selected from the multilevel dither threshold matrix when the required number of dots N is equal to 64 as shown in FIG. 8A. Then, at step S03, the position selected at step S02 for the small dot distribution mask is set to "dot ON" for printing a dot (FIG. 8B). After completion of step S03 in the small dot distribution mask generation processing, the process returns to step P08 in FIG. 5B to add 1 to M, and then proceeds to step P09 to return to step P03.

Continuously, the second dot will be explained. At step P04 in FIG. 5B, large-small dot information J (an $M^{th}$ dot in the distribution order L) is determined from the value of M and the large-small dot distribution order L (L means "small→large→small→large→ . . . " in the example) which has been determined at step P01. Because, at this stage, M is equal to 2 and L is defined as the order of small→large→small→large→ . . . , the large-small dot information J is "large dot" (hereinafter referred to as "J=large'). Next, it is determined at step P05 whether or not J=small. Since J is large at this stage, the process proceeds to step P07 in which the processing to generate the large dot distribution mask which has been defined in another step is performed. Details of the processing are shown in FIG. 5D.

At step L01 in FIG. 5D, a corresponding multilevel dither threshold D is determined from values of M. The multilevel dither threshold D is the threshold prepared in step Q02 in FIG. 5A. Because of M=2, the corresponding multilevel dither threshold becomes D=7. Then, at step L02, a position corresponding to the multilevel dither threshold D determined at step L01 is selected from the multilevel dither threshold matrix. In this example, the position of D=7 is selected from the multilevel dither threshold matrix shown in FIG. 8A. Then, at step L03, the position selected at step L02 for the large dot distribution mask is set to "dot ON" (FIG. 8C). After completion of step L03 in the large dot distribution mask generation processing, the process returns to step P08 in FIG. 5B to add 1 to M, and then proceeds to step P09 to return to step P03.

After that, the processes from steps P03 to step P09 are repeated during M<N. Eventually, when M becomes equal to N, all the blank portions of the large-small dot distribution mask which have been not set to dot ON in the earlier steps are set to "dot OFF" for preventing printing of dots. By the above-described steps, each of the large and small dot distribution masks is generated.

Up to this point, the example that the large-to-small dot distribution ratio is 1:1 has been described, but even when the large-to-small dot distribution ratio is not an integer, for example, it is 1:1.2 or the like, the distribution masks are generated in a similar manner.

Figure 7A:
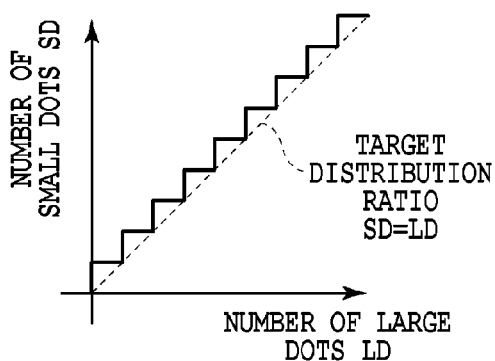
FIGS. 7A to 7E are graphs illustrating the method of determining the order in which dots are distributed in the process of generating the large-small dot distribution mask according to the first embodiment.
Figure 7B:
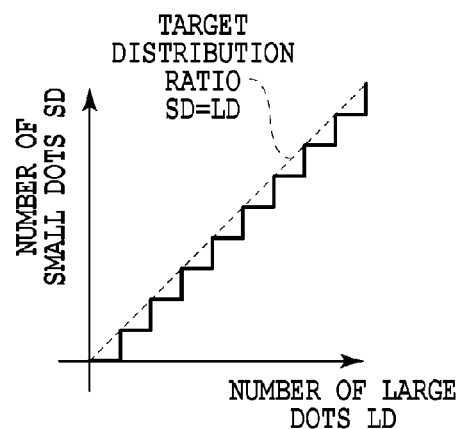
Figure 7C:
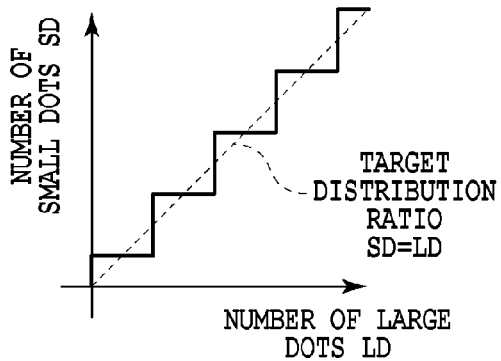
Figure 7D:
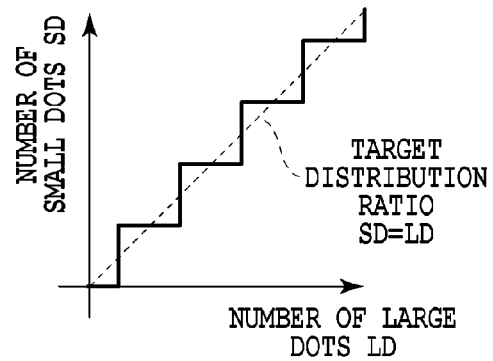
Figure 7E:
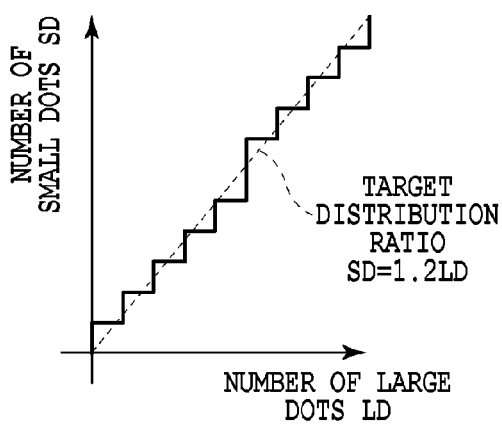

Initially, at step P01 in FIG. 5B, a required number of dots N, which is the sum of the large and small dots produced within a size of a pattern to be generated, is counted. The present embodiment shows an example that 64 dots (N=64) of a combination of the large and small dots are arranged within a pattern size of 8×8=64 pixels at a 1200 dpi resolution. Then, at step P02, large-small dot distribution order L is determined from the large-to-small dot distribution ratio. When the large-to-small dot distribution ratio is 1:1.2, if the number of small dots is SD and the number of large dots is LD, a straight line of a target distribution ratio SD=1.2LD can be drawn as shown in FIG. 7E. A graph showing large-small dot distribution order L is derived by use of square approximation or the like so as to minimize an error in an actual distribution ratio of the image data with respect to the straight line representing the target distribution ratios. When the large-to-small dot distribution ratio is 1:1.2, a distribution order is determined as the order of small→large→small→large→small→large→small→large→small→large-small as shown in FIG. 7E, in which a set of six small dots and five large dots which are assigned in an alternate order beginning with a small dot occur repeatedly. The steps from step P03 to step P09 in FIG. 5B are repeated while the condition of 1≤M<N is satisfied. First, at step P04, large-small dot information J (an $M^{th}$ dot in the distribution order L) is determined from the value of M and the large-small dot distribution order L which has been determined at step P02. Because, at this stage, M is equal to 1 and L is defined as the order of small→large→small→large→small→large→small→large→small→large→small, J=small results. Next, it is determined at step P05 whether or not J=small. Because of J=small at this stage, the process proceeds to step P06. From this step onward, the large and small dots are assigned as in the case when the large-to-small dot distribution ratio is an integer (for example, 1:1).

The large-small distribution mask described in the present embodiment may be generated based on the distribution ratio information or may be stored from the beginning and selected based on the distribution ratio information for assignment.

<Description of Quantization processing and Dot Print Position Determination Processing>

A description will be given of the processing performed in the "quantization processing-dot print position determination unit A33" to generate print data including the large dot print data and the small dot print data (hereinafter referred to as "large-small dot print data"). In the present embodiment, a multilevel dither method is employed as the quantization processing. The multilevel dither method is pseudo-halftone processing techniques in which the binary dither method is expanded to a multilevel dither method, in which there are a plurality of thresholds per pixel and a plurality of possible values of a pixel as a result of the processing. In the present embodiment, multiple level tone printing is accomplished by providing a quinary INDEX pattern of Level 0 to Level 4 per one pixel at 600 dpi.

Figure 10:
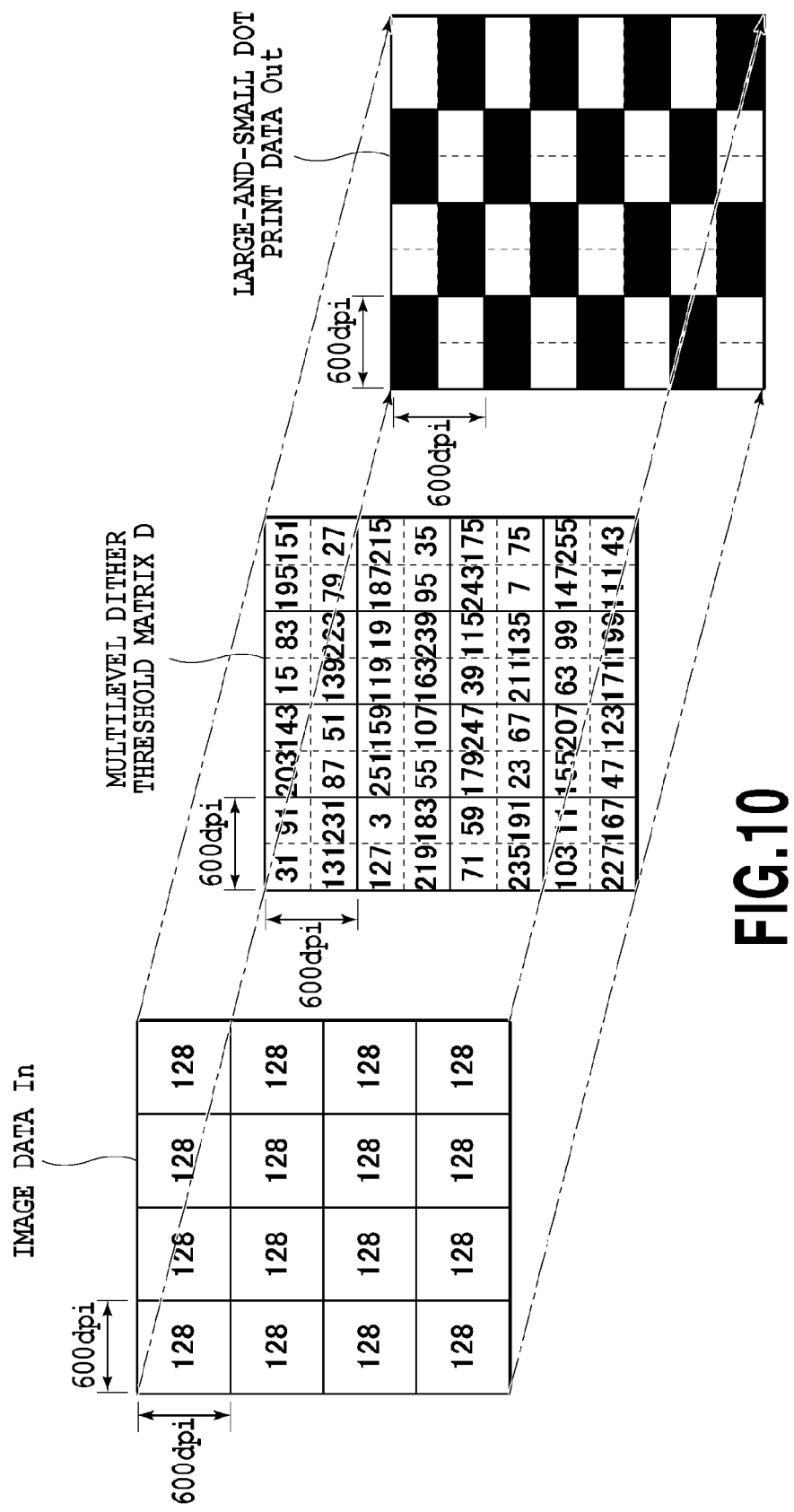
FIG. 10 is a diagram illustrating exemplary quantization processing and dot print position determination processing that are performed by use of the multilevel dither threshold matrix according to the first embodiment.

A method for generating print data on the large and small dots by use of the multilevel dither threshold matrix D generated in the process in FIG. 5A will be described with reference to FIG. 10.

Initially, image data In transmitted from the color conversion processing unit A32 is compared with the multilevel dither threshold matrix D. Focusing on the upper left pixel in FIG. 10, an input value of 600-dpi image data In is "128", but thresholds of the upper left cell and the upper right cell of the corresponding four cells at 1200 dpi in the multilevel dither thresholds matrix D are "31" and "91", respectively, which are lower than the image data In. Accordingly, the upper left and upper right cells at 1200 dpi are set to dot ON. Similarly, on the other cells, an input value of the image data In and the multilevel dither threshold matrix D are compared. Only when In>D, the cell is set to dot ON. Thus, large-small dot print data Out is generated. In FIG. 10, a cell set to dot ON is shown in black, while a cell set to dot OFF is shown in white.

In this manner, the multilevel dither threshold matrix generated in the process in FIG. 5A is used to perform the quantization processing and the dot print position determination processing.

If the size of the image data In is larger than the multilevel dither threshold matrix D, the multilevel dither threshold matrix D is repeatedly used by being shifted.

<Description of Print Dot Distribution Processing>

Figure 11:
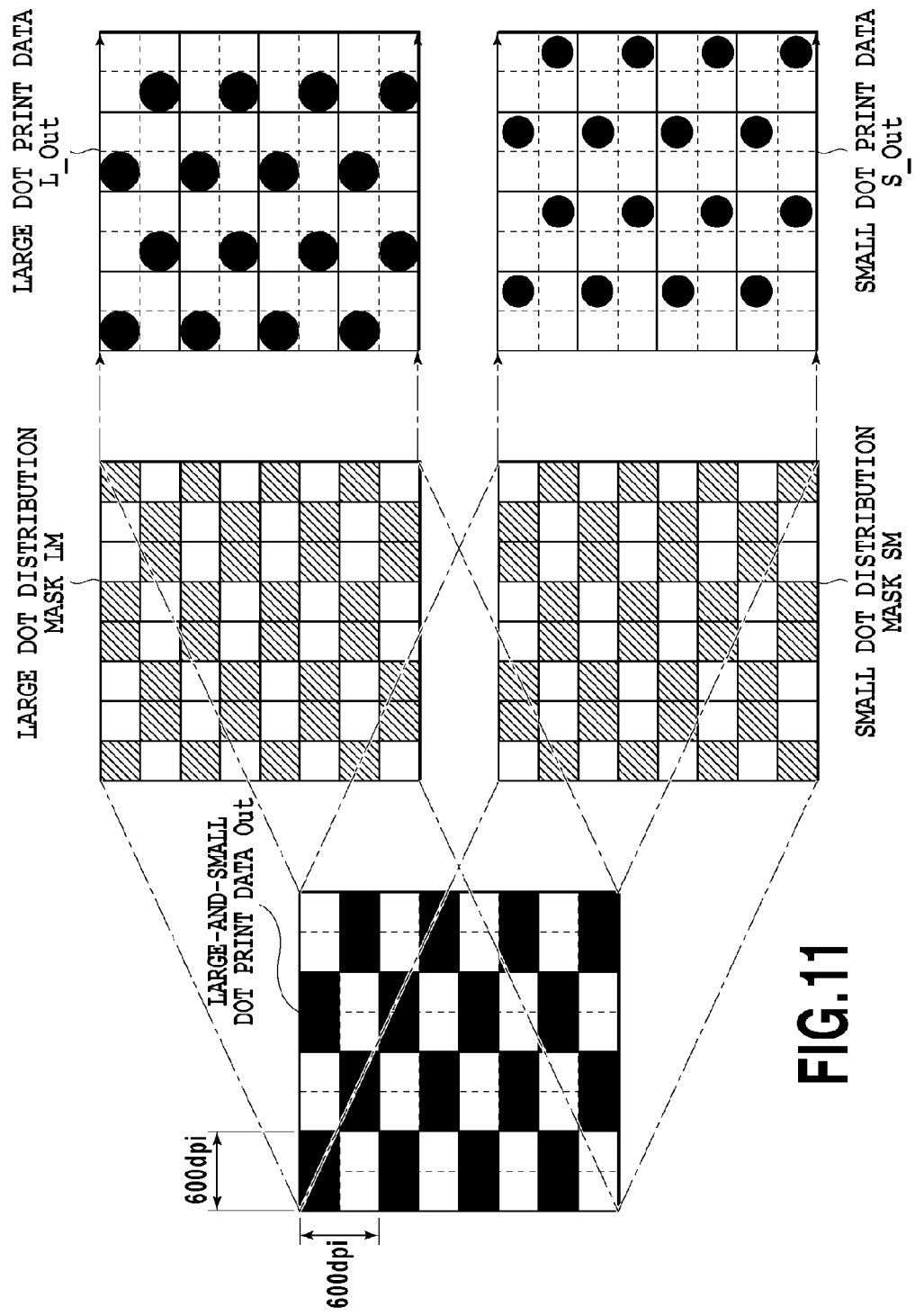
FIG. 11 is a diagram illustrating an exemplary method of generating large-and-small dot print data using the large-small dot distribution mask according to the first embodiment.

FIG. 11 illustrates the method of generating print data L_Out for distribution to large dots and print data S_Out for distribution to small dots. First, the print data L_Out for large dot distribution will be described.

The logical product of the large-small dot print data Out transmitted from the quantization processing-dot print position determination unit A33 and the large dot distribution mask LM generated in the processes in FIGS. 5B and 5D is taken. Focusing on the upper left 1200-dpi pixel of the cell in FIG. 11, the upper left cell in the large-small dot print data Out is set to dot ON, and also that in the large dot distribution mask LM is set to dot ON. Accordingly, the upper left 1200-dpi pixel is set to dot ON. Similarly, for each of the other pixels, the logical product of the large-small dot print data Out and the large dot distribution mask LM is taken, and only when both of them are set to dot ON, it is set to dot ON. Thus, the print data L_Out for distribution to the large dots is generated.

As in the case of the large dots, for the small dots, the print data S_Out for distribution to the small dots is generated. Specifically, the logical product of the large-small dot print data Out and the small dot distribution mask SM generated in the processes in FIGS. 5B and 5C is taken. Only when both of them are set to dot ON, it is set to dot ON. Thus, the print data S_Out for distribution to the small dots is generated (FIG. 11).

If the size of the large-small dot print Out is larger than the large and small dot distribution masks LM, SM, the large and small dot distribution masks LM, SM are repeatedly used by being shifted.

In the case of uniform image data with all the input values of "128", image data is distributed such that 16 dots of the large dots and 16 dots of the small dots are set to dot ON so as to achieve the 1:1 distribution ratio determined in the large-to-small dot distribution ratio determination unit A53 (FIG. 11). This makes it possible to obtain the large dot print data L_Out and the small dot print data S_Out each of which is binary at 1200 dpi.

<Setting of Distribution Ratio for Print Chip>

Figure 12:
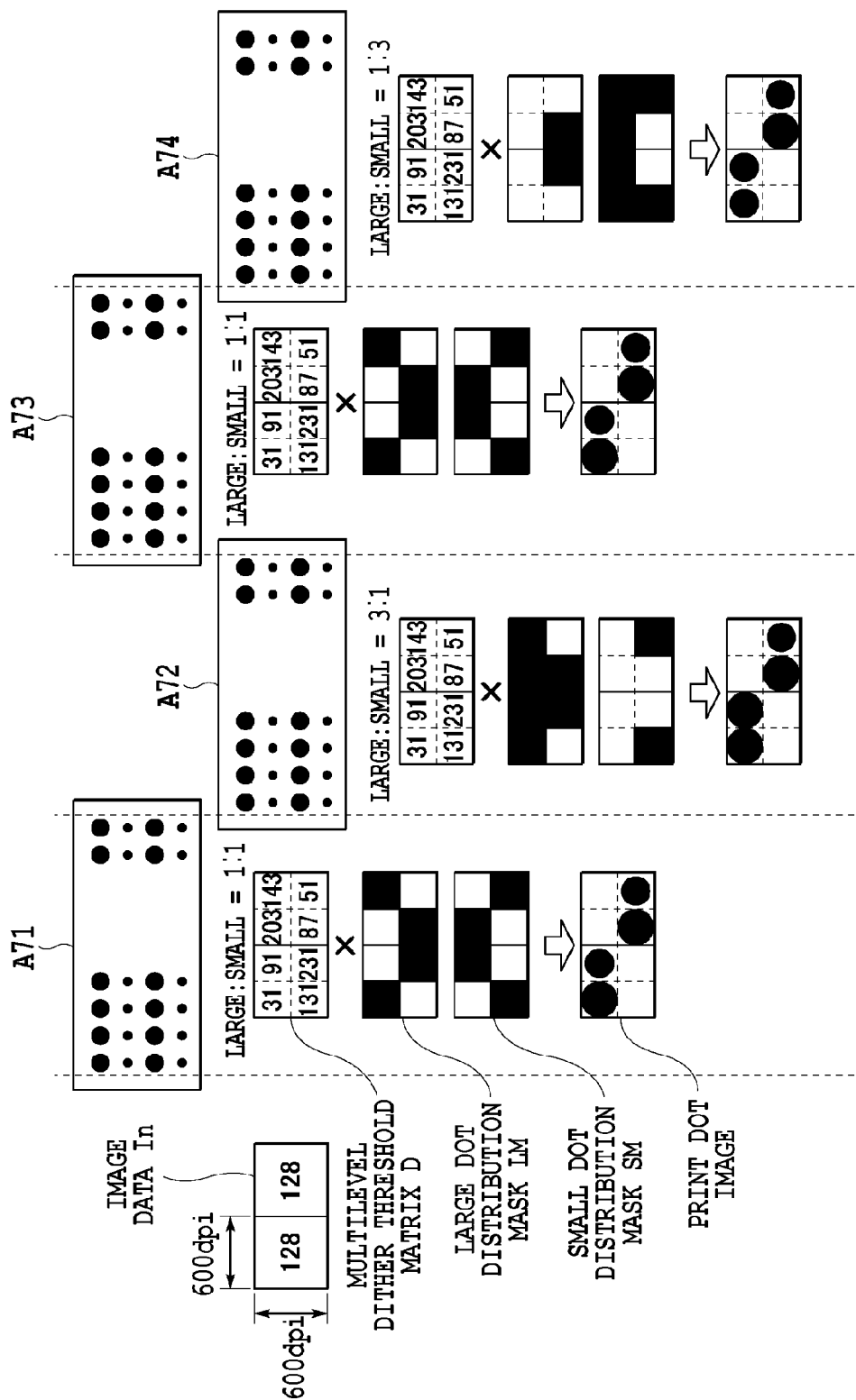
FIG. 12 is a diagram illustrating exemplary setting of a different ratio of large-small dot distribution for each print chip according to the first embodiment.

FIG. 12 illustrates a print dot image when different distribution ratios are determined for the respective print chips (A71, A72, A73, A74). The printing device A1 according to the present embodiment operates, at step D01 in FIG. 4A, the print-characteristic acquisition unit A51 to obtain ejection-amount information of the large nozzle rows (A71a and A71c in the print chip A71) and the small nozzle rows (A71b and A71d in the print chip A71) in each of the print chips A71 to A74. Because of a fixed value of the correction target ejection amount (correction target value), a large-to-small dot distribution ratio is determined on the basis of the ejection-amount information of each print chip. The large-small dot distribution mask is generated and set in accordance with each distribution ratio. FIG. 11 illustrates an example that a distribution ratio of the large dots to the small dots (hereinafter referred to as "large:small") is determined as large:small=1:1 in the print chip A71, large:small=3:1 in the print chip A72, large:small=1:1 in the print chip A73 and large:small=1:3 in the print chip A74.

With the method of generating a multilevel dither threshold matrix according to the present embodiment, it is possible to achieve fixed dot array printed on the print medium irrespective of a large-to-small distribution ratio. Because of this, even if different distribution ratios are set respectively for a plurality of print chips having different ejection amounts, the dot placement does not vary from print chip to print chip, making it possible to avoid an adverse visible effect of a change in a dot placement pattern on an image.

According to the present embodiment, the placement of print dots can be determined in relation to each input value of multilevel image data. Because of this, irrespective of input values of multilevel image data, it is possible to maintain satisfied graininess of print images.

Second Embodiment

When a large-small distribution mask is generated, a large-small dot distribution order L is determined at step P02 in FIG. 5B. At this stage, if an input value of image data In is larger than a smallest multilevel dither threshold but is equal to or smaller than a second smallest multilevel dither threshold, a first distribute dot alone, that is, a small dot or a large dot alone, is printed, which makes it impossible to correct the ejection amount to approach the correction target ejection amount. To avoid this, in this case, the distribution mask is switched to another one with the first distributed dot changed in accordance with the large-to-small dot distribution ratio to approach a target large-to-small dot distribution ratio across the print image.

Figure 13A:
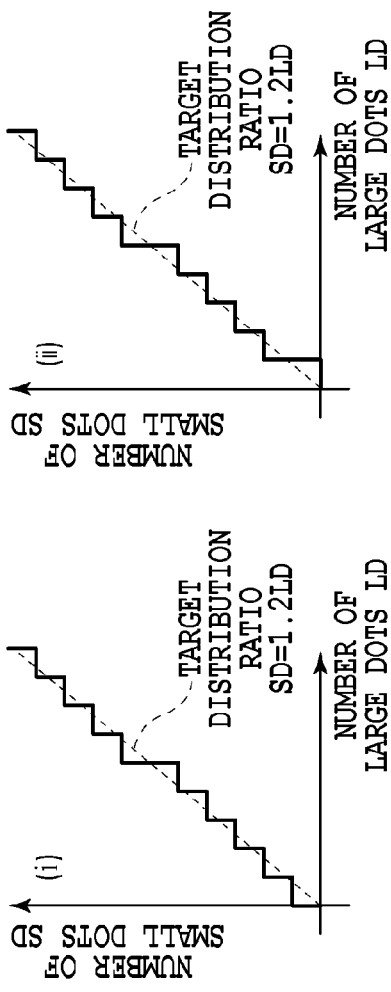
FIGS. 13A to 13D are diagrams illustrating distribution mask switching according to a second embodiment.
Figure 13B:
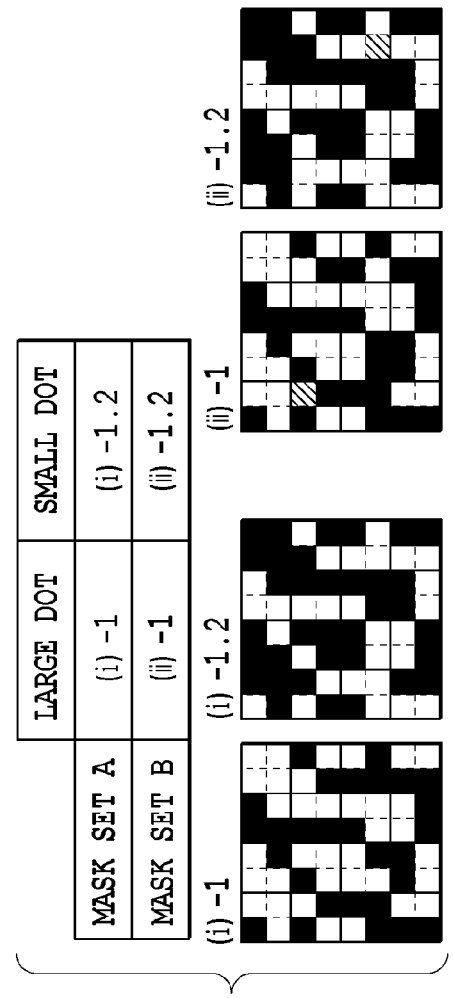

FIG. 13A shows a graph (i) of the large-small dot distribution order L determined at a large-to-small dot distribution ratio of 1:1.2, and a graph (ii) in which the order of the first distributed dot and the second distributed dot in the graph (i) is changed. FIG. 13B illustrates exemplary sets of large-small distribution masks generated in each of the distribution orders in the graphs (i) and (ii) in FIG. 13A.

A mask set A (first mask set) shows a combination of the large and small distribution masks (i)-1 and (i)-1.2 corresponding to the large-small dot distribution order in the graph (i) in FIG. 13A. A mask set B (second mask set) shows a combination of the large and small distribution masks (ii)-1 and (ii)-1.2 corresponding to the large-small dot distribution order in the graph (ii) in FIG. 13A. The hatched cells in the distribution masks in the mask set B are set to dot ON by changing the distribution order, but the corresponding cells in the corresponding distribution masks in the mask set B are set to dot OFF.

Figure 13C:
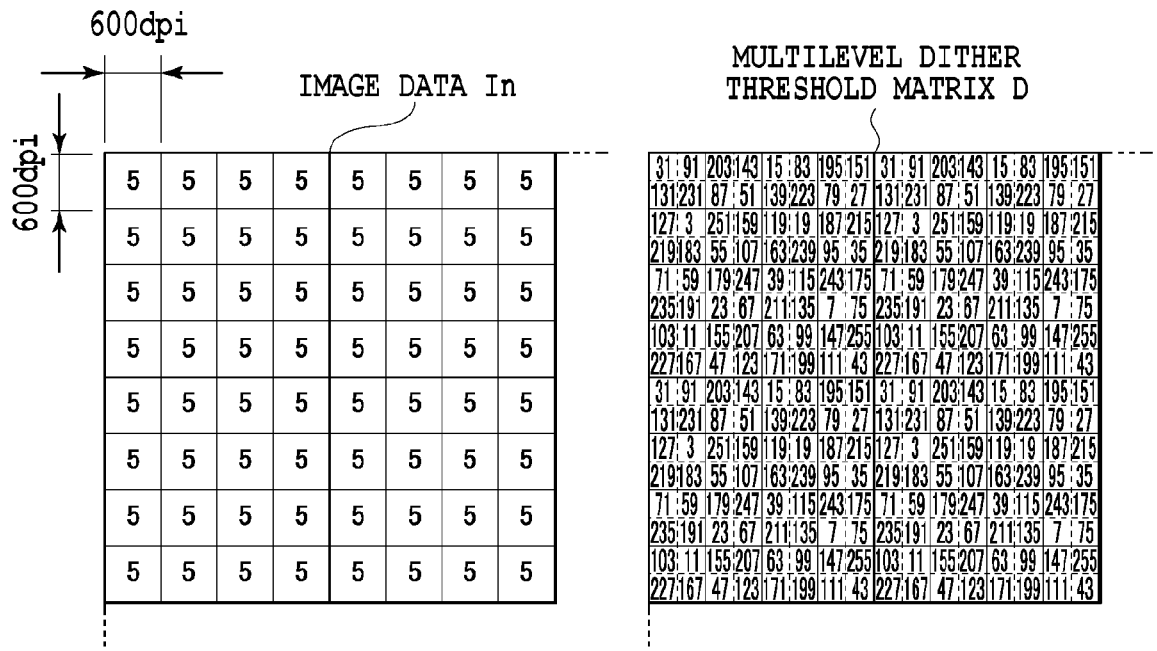
Figure 13C:
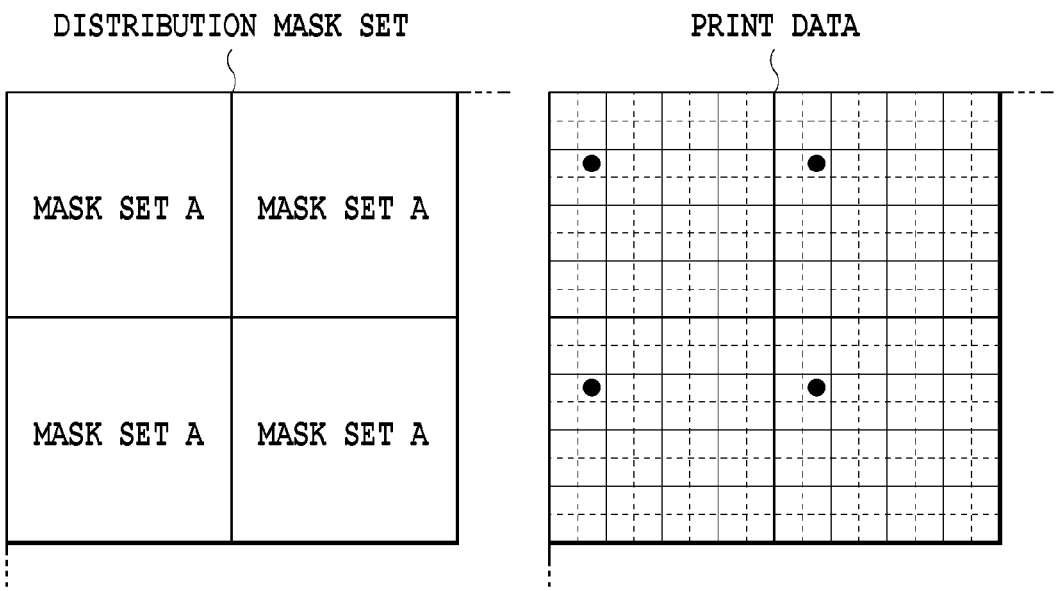

In the case of a filled-in image in which an input value of the image data is larger than a smallest multilevel dither threshold but is equal to or smaller than a second smallest multilevel dither threshold, the use of the distribution mask (mask set A) alone generated by the method described in the first embodiment permits printing of only the small dots (FIG. 13C). To avoid this, when the distribution order is determined from the large-to-small dot distribution ratio at step P02 in the distribution mask generation process shown in FIG. 5B, the following change is made. Specifically, in the large-small dot distribution order (i) derived such that an error from the straight line of the target distribution ratio shown in FIG. 13A is minimized, the first dot is changed to the other dot, and, from that point on, a distribution order (ii) is determined such that an error from the straight line of the target distribution ratio becomes minimized. Then, the distribution mask is generated for each distribution order.

Figure 13D:
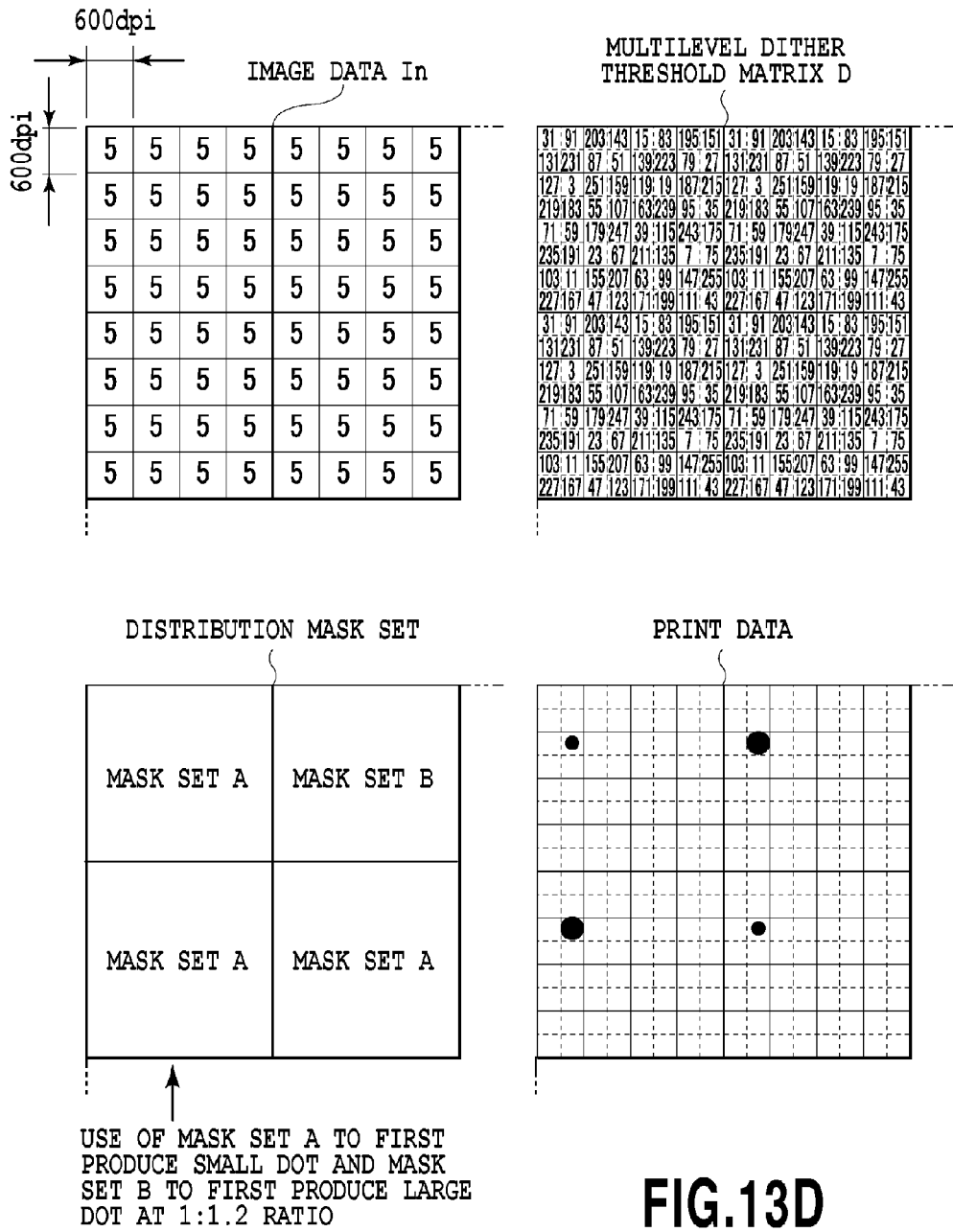

A difference between the mask set A which is a set of distribution masks generated from the distribution order (i) and the mask set B which is a set of distribution masks generated from the distribution order (ii) is that the first produced dot changes positions with the second produced dot. Switching between the mask sets A and B is done at a use ratio in accordance with the large-to-small dot distribution ratio for use. As shown in FIG. 13D, the mask set B in which a large dot is produced at the start and the mask set A in which a small dot is produced at the start are used by switching at a use ration of 1:1.2, resulting in a 1:1.2 occurrence ratio of the large dot produced at the start. This method makes it possible to achieve the target ejection amount.

In this manner, according to the present embodiment, irrespective of input values of multilevel image data, it is possible to maintain satisfied graininess of print images.

Third Embodiment

Even if the dot placement of a combination of the large and small dots exhibits an effectively dispersing characteristic, when the dot placement of the large dots alone or the small dots alone exhibits an inferior dispersing characteristic, a difference in size between the large and small dots may increases the graininess of the printed image (increases the granularity). To avoid this, in addition to the structure of the first embodiment, the present embodiment performs calculations of repulsive potential used for generating the multilevel dither threshold matrix with consideration of the dispersing characteristics of the placement of the large dots alone and the dispersing characteristic of the placement of the small dots alone.

Figure 14B:
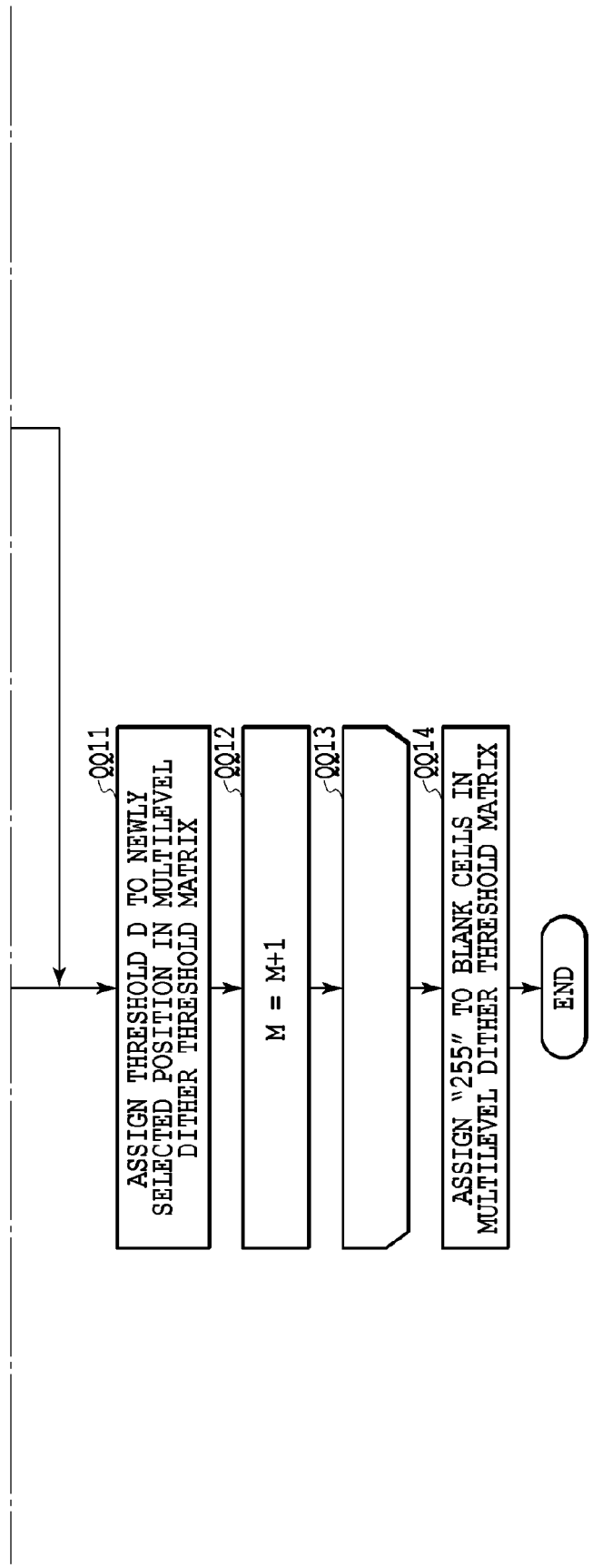
FIG. 14B is a flowchart illustrating an exemplary method for generating a multilevel dither threshold matrix according to a third embodiment.

FIG. 14 is the process illustrating a method for generating a multilevel dither threshold matrix with consideration of the dispersing characteristics of the large-dot placement and the small-dot placement in addition to the dispersing characteristic of the dot displacement including the large and small dots. Initially, at step QQ01, a required number of dots N, which is the sum of the large and small dots produced within a size of a pattern to be generated, is counted. The present embodiment shows an example that 64 dots (N=64) of a combination of the large and small dots are arranged within a pattern size of 8×8=64 pixels at a 1200 dpi resolution. Then, at step QQ02, multilevel dither thresholds D are prepared according to the required number of dots N of the combination of large and small dots. In the present embodiment, image data to which the quantization processing is applied has 256 tone levels. The levels from zero to 255 is divided into 64 in order to arrange the 64 dots (N=64) of the combination of large and small dots. As a result, the multilevel dither thresholds result in an arithmetic progression {3, 7, 11, 15, . . . , 255} with 64 terms in total of which the initial term is 3 and each constant increment is 4. Then, at step QQ03, large-small dot distribution order L is determined from the large-to-small dot distribution ratio. For example, if the large-to-small dot distribution ratio is 1:1, a straight line of a target distribution ratio SD=LD can be drawn as shown in FIGS. 7A to 7D. A graph showing large-small dot distribution order L is derived by use of square approximation or the like so as to minimize an error from the line. When the large-to-small dot distribution ratio is 1:1, the distribution order L is determined to be any of four sequences of the order of small→large→small→large→ . . . in FIG. 7A, the order of large→small→large-small→ . . . in FIG. 7B, the order of small→large→large-small→ . . . in FIG. 7C, and the order of large→small→small→large→ . . . in FIG. 7D. The following description takes FIG. 7A as an example. The steps from step QQ04 to step QQ13 are repeated while the condition of 1≤M<N is satisfied. First, at step QQ05, large-small dot information J (an $M^{th}$ dot in the distribution order L) is determined from the value of M and the large-small dot distribution order L (L means "small→large→small→large→ . . . " in the example) which has been determined at step QQ03. Because, at this stage, M is equal to 1 and L is defined as the order of small→large→small→large→ . . . , the large-small dot information J results in J=small. Next, it is determined at step QQ06 whether or not J=small. Since J=small at this stage, the process proceeds to step QQ07 to select a position where a "repulsive potential_integrated value" is lowest with consideration of the dispersing characteristic of the dot placement including the large and small dots and the dispersing characteristic of the dot displacement of the small dots alone.

In this connection, repulsive potential used for assigning thresholds to a matrix in the present embodiment is described. The present embodiment describes improvements in the dispersing characteristics of dot placement of large dots alone and dot placement of small dots alone in addition to the dispersing characteristics of dot placement including the large and small dots. To this end, when the large dots are arranged, the sum of repulsive potential Pot_OR of the dot placement including the large and small dots and repulsive potential Pot_large of the dot placement of the large dots alone is taken to derive comprehensive repulsive potential Pot_sum. Similarly, when the small dots are arranged, the sum of repulsive potential Pot_OR of the dot placement including the large and small dots and repulsive potential Pot_small of the dot placement of the small dots alone is taken to derive comprehensive repulsive potential Pot_sum. Then, in either case, a dot is assigned to a position where Pot_sum stands at a lowest value. As expressed by the following equation, when Pot_sum is derived, a weight is assigned to each repulsive potential as appropriate. For the weighting, numerals are assigned to select a coefficient of weighting providing a desired dispersing characteristic.

Pot_sum=αPot_large+βPot_OR (placement of large dots)

Pot_sum=αPot_small+βPot_OR (placement of small dots)

(α, β: coefficient of weighting)

Continuously, the process to generate the multilevel dither threshold matrix will be described. At step QQ07, a position where a "large-small dot+small dot repulsive potential_integrated value" is lowest is selected from 8×8 matrix cells. For placing the first dot, an arbitrary print position is selected because the "large-small dot+small dot repulsive potential_integrated value" stands at "zero" in any position. In this example, it is assumed that the position indicated with the white empty star-shaped symbol in FIG. 6A is selected. Then, at step QQ08, the repulsive potential in the selected position is added to the "large-small dot+small dot repulsive potential_integrated value". Then, at step QQ11, the threshold D prepared at step QQ02 is set to the selected position in the matrix (FIG. 6B). Then, at step QQ12, 1 is added to M, and then the process returns from step QQ13 to step QQ04.

Continuously, assignment of the second threshold will be described. M=2 (<N) is determined at step QQ04 in FIG. 14. At step QQ05, large-small dot information J (an $M^{th}$ dot in the distribution order L) is determined from the value of M and the large-small dot distribution order L (L means "small→large→small→large→ . . . " in the example) which has been determined at step QQ03. Because, at this stage, M is equal to 2 and L is defined as the order of small→large→small→large→ . . . , J=large results. Next, it is determined at step QQ06 whether or not J=small. Since J=large at this stage, the process proceeds to step QQ09. At step QQ09, a position where a "large-small dot+large dot repulsive potential_integrated value" is lowest is selected from 8×8 matrix cells. In this example, it is assumed that the position indicated with the black solid star-shaped symbol in FIG. 6A is selected. Then, at step QQ10, the repulsive potential in the selected position is added to the "large-small dot+large dot repulsive potential_integrated value". Then, at step QQ11, the threshold prepared at step QQ02 is set to the selected position in the matrix (FIG. 6C). Then, at step QQ12, 1 is added to M, and then the process returns from step QQ13 to step QQ04.

After that, the steps from step QQ04 to QQ13 are repeated during M<N. Eventually, when N and M become equal, at step QQ14, "255" is assigned to all the blank portions in the multilevel dither threshold matrix for setting to dot OFF to prevent printing of dots. By the above-described steps, a multilevel dither threshold matrix is generated with consideration of the dispersing characteristics of dot placement of large dots alone and dot placement of small dots alone in addition to the dispersing characteristic of dot placement of the large and small dots.

The multilevel dither threshold matrix described in the present embodiment may be generated together with the large-small dot distribution mask based on the distribution ratio information or may be stored from the beginning for assignment.

With the method according to the present embodiment, since the large-small dot placement in relation to each input value of multilevel image data can be determined with a desired dispersing characteristic, it is possible to maintain satisfied graininess of a print image, irrespective of the input values of the multilevel image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104220, filed May 9, 2011, which is hereby incorporated by reference herein in its entirety.

What is claimed is:

1. A printing device capable of using a print head ejecting ink from a plurality of nozzles to print ink dots of a plurality of dot diameters on a print medium, comprising:
   a print-characteristic obtaining unit configured to obtain print characteristic information on dot volume of ink dots to be printed from predetermined portions of the plurality of nozzles;
   a distribution ratio determination unit configured to determine a distribution ratio for distributing image data to the predetermined portions of the plurality of nozzles for each of the plurality of dot diameters on the basis of the print characteristic information;
   a dot print position determination unit configured to determine a dot print position on an area, corresponding to a predetermined number of pixels, on the print medium by quantizing the image data based on threshold values to be compared with gradation values of the image data which are arrayed corresponding to the area; and
   a print dot distribution processing unit configured to distribute printing of each of the ink dots of the plurality of dot diameters to the dot print position determined by the dot print position determination unit using a plurality of mask patterns indicating print-permitting position on the print medium for each of the ink dots of the plurality of dot diameters, wherein the plurality of mask patterns are based on a dot distribution order, for distributing each of the ink dots of the plurality of dot diameters to a plurality of dot print positions corresponding to an order of the arrayed threshold values, determined in accordance with the distribution ratio, wherein the print dot distribution processing unit determines the plurality of mask patterns to be used for each of the predetermined portions of the plurality of nozzles.

2. The printing device according to claim 1, wherein the dot distribution order is determined to minimize an error between the distribution ratio determined by the distribution ratio determination unit and an actual distribution ratio of image data.

3. The printing device according to claim 1, wherein the printing device includes a first mask set and a second mask set,
the first mask set includes the plurality of mask patterns,
the second mask set includes the plurality of mask patterns generated on the basis of the dot print position determined by the dot print position determination unit and a dot distribution order generated by a changing of positions between a first dot and a second dot in the dot distribution order, and
the printing device switches between the first mask set and the second mask set in accordance with the distribution ratio.

4. The printing device according to claim 1, wherein the array of the thresholds is determined in accordance with the distribution ratio.

5. A printing method employed by a printing device capable of using a print head ejecting ink from a plurality of nozzles to print ink dots of a plurality of dot diameters on a print medium, comprising:
a print-characteristic obtaining step of obtaining print characteristic information on dot volume of ink dots to be printed from predetermined portions of the plurality of nozzles;
a distribution ratio determination step of determining a distribution ratio for distributing image data to the predetermined portions of the plurality of nozzles for each of the plurality of dot diameters on the basis of the print characteristic information;
a dot print position determination step of determining a dot print position on an area, corresponding to a predetermined number of pixels, on the print medium by quantizing the image data based on threshold values to be compared with gradation values of the image data which are arrayed corresponding to the area; and
print dot distribution processing steps of distributing printing of each of the ink dots of the plurality of dot diameters to the dot print position determined by the dot print position determination step using a plurality of mask patterns indicating print-permitting position on the print medium for each of the ink dots of the plurality of dot diameters, wherein the plurality of mask patterns are based on a dot distribution order, for distributing each of the ink dots of the plurality of dot diameters to a plurality of dot print positions corresponding to an order of the arrayed threshold values, determined in accordance with the distribution ratio, wherein the print dot distribution processing steps determine the plurality of mask patterns to be used for each of the predetermined portions of the plurality of nozzles.

6. The printing method according to claim 5, wherein the dot distribution order is determined to minimize an error between the distribution ratio determined by the distribution ratio determination unit and an actual distribution ratio of image data.

7. The printing method according to claim 5, wherein the printing device includes a first mask set and a second mask set,
the first mask set includes the plurality of mask units,
the second mask set includes the plurality of mask units generated on the basis of the dot print position determined by the dot print position determination unit and a dot distribution order generated by a changing of positions between a first dot and a second dot in the dot distribution order, and
the printing device switches between the first mask set and the second mask set in accordance with the distribution ratio for use.

8. The printing method according to claim 5, wherein the array of the thresholds is determined in accordance with the distribution ratio.

9. A printing device capable of using a print head ejecting ink from a plurality of nozzles to print ink dots of a plurality of dot diameters on a print medium, comprising:
a print-characteristic obtaining unit configured to obtain print characteristic information on dot volume of ink dots to be printed from predetermined portions of the plurality of nozzles;
a distribution ratio determination unit configured to determine a distribution ratio for distributing image data to the predetermined portions of the plurality of nozzles for each of the plurality of dot diameters on the basis of the print characteristic information;
a dot print position determination unit configured to determine a dot print position on an area, corresponding to a predetermined number of pixels, on the print medium by quantizing the image data based on threshold values to be compared with gradation values of the image data which are arrayed corresponding to the area; and
a print dot distribution processing unit configured to distribute printing of each of the ink dots of the plurality of dot diameters to the dot print position determined by the dot print position determination unit using a plurality of mask patterns indicating print-permitting position on the print medium for each of the ink dots of the plurality of dot diameters, wherein the plurality of mask patterns are based on a dot distribution order, for distributing each of the ink dots of the plurality of dot diameters to a plurality of dot print positions corresponding to an order of the arrayed threshold values, determined in accordance with the distribution ratio,
wherein the dot distribution order is determined to minimize an error between the distribution ratio determined by the distribution ratio determination unit and an actual distribution ratio of image data.

10. A printing device capable of using a print head ejecting ink from a plurality of nozzles to print ink dots of a plurality of dot diameters on a print medium, comprising:
a print-characteristic obtaining unit configured to obtain print characteristic information on dot volume of ink dots to be printed from predetermined portions of the plurality of nozzles;
a distribution ratio determination unit configured to determine a distribution ratio for distributing image data to the predetermined portions of the plurality of nozzles for each of the plurality of dot diameters on the basis of the print characteristic information;
a dot print position determination unit configured to determine a dot print position on an area, corresponding to a predetermined number of pixels, on the print medium by quantizing the image data based on threshold values to be compared with gradation values of the image data which are arrayed corresponding to the area; and a print dot distribution processing unit configured to distribute printing of each of the ink dots of the plurality of dot diameters to the dot print position determined by the dot print position determination unit using a plurality of mask patterns indicating print-permitting position on the print medium for each of the ink dots of the plurality of dot diameters, wherein the plurality of mask patterns are based on a dot distribution order, for distributing each of the ink dots of the plurality of dot diameters to a plurality of dot print positions corresponding to an order of the arrayed threshold values, determined in accordance with the distribution ratio, wherein the printing device includes a first mask set and a second mask set, the first mask set includes the plurality of mask patterns, the second mask set includes the plurality of mask patterns generated on the basis of the dot print position determined by the dot print position determination unit and a dot distribution order generated by a changing of positions between a first dot and a second dot in the dot distribution order, and the printing device switches between the first mask set and the second mask set in accordance with the distribution ratio.

* * * * *